US011949231B1

United States Patent
Hansen et al.

(10) Patent No.: US 11,949,231 B1
(45) Date of Patent: Apr. 2, 2024

(54) RENEWABLE ENERGY POWER PLANT NETWORK SIMULATOR

(71) Applicant: 8ME NOVA, LLC, El Dorado Hills, CA (US)

(72) Inventors: Lukas Hansen, El Dorado Hills, CA (US); Gautham Ramesh, Emeryville, CA (US); Philippe Garneau-Halliday, Chicago, IL (US); Kyle Monson, West Richland, WA (US); Brandon Carpenter, Burbank, WA (US); Rahul Mondal, Rancho Cordova, CA (US); Emily Arnold, Camp Connell, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/370,658

(22) Filed: Sep. 20, 2023

(51) Int. Cl.
*H02J 13/00* (2006.01)

(52) U.S. Cl.
CPC ..... *H02J 13/00002* (2020.01); *H02J 2203/20* (2020.01)

(58) Field of Classification Search
CPC .......... H02J 13/00002; H02J 2203/20
See application file for complete search history.

(56) References Cited

U.S. PATENT DOCUMENTS

| 9,461,471 | B2* | 10/2016 | Forbes, Jr. | H02J 3/14 |
| 2010/0217550 | A1* | 8/2010 | Crabtree | H02J 3/007 |
| | | | | 702/62 |
| 2016/0077507 | A1* | 3/2016 | Sheble | G06Q 10/06 |
| | | | | 700/295 |
| 2016/0261115 | A1* | 9/2016 | Asati | H02J 3/14 |
| 2017/0109674 | A1* | 4/2017 | Parvania | G06Q 10/06312 |
| 2023/0061173 | A1* | 3/2023 | Hannon | H02J 3/004 |
| 2023/0198258 | A1* | 6/2023 | Shi | H02J 3/06 |
| | | | | 700/291 |

* cited by examiner

*Primary Examiner* — Ziaul Karim
(74) *Attorney, Agent, or Firm* — Foley & Lardner LLP

(57) ABSTRACT

A system for optimizing a network of power plants includes at least one memory storing a network model of a network of power plants including a power plant model for each power plant, each power plant model including one or more equipment models of power plant equipment of a power plant, and plant relationships between the power plant models. The system further includes at least one processor configured to modify an attribute of a first equipment model included in a first power plant model of a first power plant, identify at least one plant relationship between the first power plant model and a second power plant model of a second power plant, determine an expected change in operation of the second power plant based on the modified attribute and the at least one plant relationship, and generate a record including an indication of the expected change.

21 Claims, 5 Drawing Sheets

RENEWABLE ENERGY POWER PLANT NETWORK SIMULATOR

BACKGROUND

Renewable energy power plants (REPPs) may include one or more renewable energy sources (RES), such as photovoltaic (PV) panels and wind turbines. A REPP may be configured to supply electricity to nearby behind-the-meter (BTM) loads, such as homes, commercial buildings, or electrolysis plants without connecting first to a power grid. The REPP may also be connected to a commercial electricity grid so that energy produced by the RES can be sold to the grid. The RES, the grid, and the BTM load can also be electrically coupled to an energy storage system (ESS) of the REPP, such as a battery bank. The ESS may store electricity generated by the RES or from the grid and may deliver the energy to the grid or the BTM load. Various factors, such as the weather, the time of day, and the time of year may affect the rate of power production by the RES. The demand for electricity from the power grid and the BTM loads may vary based on several factors, such as weather, time of day, time of year, day of week, power needs of the BTM load, power output of other power plants connected to the electrical grid. Accordingly, the operator of the REPP may wish to put the energy generated by the RES or stored in the ESS to the best use by controlling the flow of power in the REPP, for example, by supplying power to loads with higher demand. Further, the operator of the REPP may operate several REPPs. The operator may wish to control the flow of power from the various REPPs to optimize efficiency and minimize waste.

Figure 1:
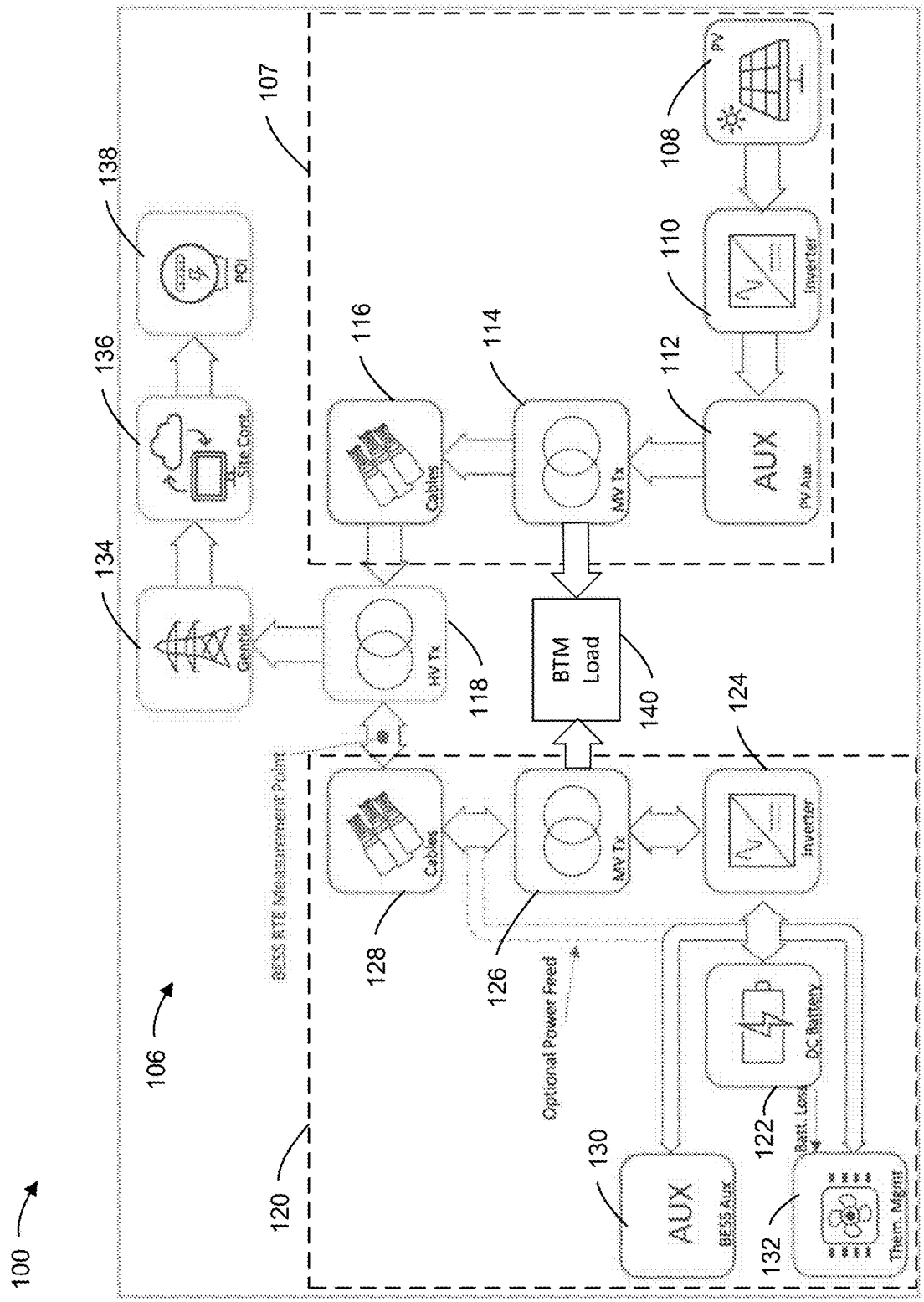
FIG. 1 is a schematic diagram of a modeling tool for modeling power plants, according to some embodiments.

The foregoing and other features of the present disclosure will become apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As discussed above, a renewable energy power plant (REPP) may include a renewable energy source (RES) and an energy storage system (ESS). The RES may include, for example, a solar panel array, a wind turbine, a hydroelectric plant, etc. The ESS may include a battery (e.g., a battery bank, batteries, etc.), a flywheel, a thermal energy storage device, a reversible fuel cell, etc. The embodiments described herein may primarily refer to a solar panel array and a battery as respective examples of a RES and an energy storage device in an ESS. However, it should be understood that similar embodiments incorporating other RESs and energy storage devices are contemplated herein. The REPP may be connected to a power grid, and both the RES and the ESS may supply power to the grid. The grid may also supply power to the ESS. The REPP may also supply power to a behind-the-meter (BTM) load, such as an electrolysis plant configured to generate hydrogen from water by electrolysis using power from the RES, the ESS, or the grid. The BTM load may be connected to the RES and the ESS such that power from the RES in the ESS does not need to pass through the grid to reach the BTM load.

RESs may have higher variations in power output compared to nonrenewable energy sources due to changes in weather, time of day, and time of year. For example, a solar RES may have a maximum power output during the middle of a sunny day in the summer and may have lower or no power output at night, on cloudy days, and in the winter when the sun is lower in the sky. There may also be fluctuations in power demand from the grid. For example, in the southwestern United States, power demands on the grid are commonly at their highest during the evening in the summer when grid customers are using air conditioning. Depending on these factors, it may be more efficient to supply power to the grid at certain times and to the BTM load and/or the ESS at other times. Accordingly, a solution is needed for modeling the REPP and the associated loads to determine the optimal flow of power in the system. For example, it may be advantageous to prioritize delivering power to certain components over others at different times, depending on various factors including efficiency, energy demand, contractual obligations, and electricity prices, which may all be time dependent.

Further, the operator of a REPP may operate several REPPs or other non-renewable power plants. In some cases, it may be more efficient to deliver power from one power plant to a load than from another plant. As a simple example, transmission losses caused by transmitting power over long distances may make it more efficient to supply power from a power plant closer to a load than one that is farther away from the load. Power plants, including fossil fuel power plants and REPPs, may also consume power to ensure that essential equipment, including transformers, inverters, plant controls, and thermal controls, can operate. Offices and other infrastructure onsite at the plant may also require power for heating, ventilation, air conditioning, lights, computers, servers, and other office equipment. The power required to operate the power plant is referred to as "station power." While the plant is operating, and the energy demands of the plant's customers allow, the station power can be supplied by the power plant itself. That is, if the energy generated by the power plant minus the energy supplied to BTM loads and the grid exceeds the station power, the power plant may supply its own station power. However, when the power plant equipment does not generate sufficient power to supply its own station power, the power plant may have to reduce the power it supplies to BTM loads and/or the grid or even take power from the grid. For example, a solar power plant may take its station power from the grid at night, when the solar power plant is not generating power. An operator of multiple power plants can sometimes use energy generated at a first power plant to supply the station power for a second power plant via the grid. For example, an operator of multiple solar power plants without ESSs may supply power from a first power plant in a sunny area to a second power plant in a cloudy area during a time period. As the weather changes and clouds shift, power generated by the second power plant may supply the station power for the first power plant. The transfer of power between energy generation sites may be referred to as "wheeling power." Operators may prefer to "wheel power" between the power plants that they operate over taking energy off the grid from an unknown source, for example, to avoid using grid power charged at retail prices or using non-renewable power for the station power of a REPP. A solution is needed for modeling multiple power plants (e.g., multiple REPPs) controlled by the same operator to determine the optimal flow of power from the power plants to the loads and between power plants.

The systems and methods discussed herein may provide a data structure (e.g., a graph database) that can be used to model the flow of power from one or more power plants, including one or more REPPs, to determine the optimal flow of energy from the power plants, including from RESs and ESSs, to various BTM loads, ESSs, power grids, and other power plants to maximize efficiency and income for the power plant owner or operator. The models can include relationships between representations of power plant equipment and between representations of power plants themselves that are stored in memory that can be used to determine the effect of modifying different aspects of the REPPs, such as their components, controls, or their operation more generally. The relationships can enable a computer to determine the effect of a modification at one REPP on operation of another REPP and/or equipment within the respective REPPs. For example, an updated degradation schedule of a battery in a first solar REPP may indicate that that battery may, over time, come to have a lower energy storage capacity than previously expected and may therefore reach a maximum state of charge (SOC) faster than previously expected. Because the battery reaches its maximum SOC faster than previously expected, a solar array may supply more energy than previously expected to a power grid during the day, as the battery cannot receive more energy. During the day, the power output from a nonrenewable power plant connected to the same power grid may be reduced based on the added power supplied by the solar array. At night, the battery may supply power to the grid. However, because the energy storage capacity is lower than previously expected, the battery may run out of charge earlier than previously expected, and the power output from the nonrenewable power plant may need to be increased to compensate for the reduced output from the battery. The data structure used to model the flow of power between a network of power plants may help to identify the network-wide effects of a change to a single piece of equipment or a single power plant. By modeling the network, the expected power flows within and from each power plant can be determined, and decisions can be made regarding power output from energy sources, battery charging and discharging schedules, equipment sizing and quantities, equipment replacement and augmentation schedules, and equipment financing options. Systems for modeling and simulating individual power plants cannot determine the effects of a modification of a first power plant on a second power plant. The systems described herein allow an operator of a network of power plants to make operating decisions that benefit the entire network rather than considering each power plant in isolation.

Power Flow Simulation in a Power Plant Model

Referring to FIG. 1, a schematic diagram of a model 100 of an energy system 106 is shown, according to some embodiments. The energy system 106 shown in the model 100 includes one power plant. Each component of the energy system 106 may be represented by a computational block, which may be referred to as an equipment model. In some embodiments, an equipment model as described herein may include a table with various attribute-value pairs that include value for different attributes or states of the equipment and/or pointers to other equipment models. The pointers can be stored relationships between the equipment models. The equipment model and or the model 100 can be Strapi models (e.g., collection type Strapi models that each include a table with attribute field-value pairs indicating different attributes or relationships of the equipment, system, or power plant the model represents). In some embodiments, the relationships can be attribute field-value pairs within the Strapi models for the equipment or the model 100 or can be separate single type Strapi models. In one example, an equipment model of a battery may include a capacity attribute with a value of 100 MWh and a charge-rate attribute of 20 MW. For clarity, the computational blocks in the model may be referred to as the components of the energy system 106 that they represent. For example, the model may include a computational block representing an RES, which may simply be referred to as an RES. Similarly, groups of computational blocks may be referred to as the components of the energy system that they represent. Thus, a group of computational blocks representing an ESS may simply be referred to as an ESS. Computational blocks that do not represent specific components of the energy system 106 may be referred to as blocks. The model 100 may be updated periodically (e.g., hourly, every minute, etc.) or continuously to account for changing loads and power generation. The model may be used to forecast power flows through the energy system based on models of the energy system components and expected demand from loads connected to the energy system. As described herein, equipment and/or plants and the models representing the equipment and/or plants can be referenced interchangeably and/or with the same reference numbers.

The model 100 of the energy system 106 may include a power generation system model 107 including a model of an RES 108. The RES 108 may be, for example, a solar panel array. The RES 108 may be coupled to an inverter 110 configured to convert DC power generated by the RES 108 to AC power. The model 100 of the energy system 106 may include a RES auxiliary load block 112. The RES auxiliary load block 112 may represent power losses associated with the RES 108, including inefficiencies of inverter 110 and station power required to operate the RES 108. In some embodiments, the auxiliary loads may be included in the equipment models of the power generation system 107 (e.g., in the equipment model of the RES 108 and/or the inverter 110). The model 100 of the energy system 106 may include a first medium voltage transformer 114 to increase the voltage received from the inverter 110. Additional power losses may occur at the first medium voltage transformer 114, which may be taken into account by the model 100. The model 100 of the energy system 106 may include RES cables 116 to transmit power from the first medium voltage transformer 114 to a high voltage transformer 118. Additional power losses (e.g., transmission losses) may occur in the cables 116, which may be taken into account by the model 100. In some embodiments, the RES cables 116 may be a computational block representing all cable losses between the RES 108 and the high voltage transformer 118. The blocks representing the RES 108, the inverter 110, the RES auxiliary the load block 112, the first medium voltage transformer 114, and the RES cables 116 may be arranged in the order that the components that they represent are arranged. Thus, the calculation of losses in the first medium voltage transformer 114 may take into account previous losses in the RES auxiliary load block 112, and the calculation of transmission losses in the cables 116 may take into account the previous losses in the RES auxiliary load block 112 and the first medium voltage transformer 114.

The ESS 120 of the energy system 106, which may include a battery 122 (e.g., a battery bank, batteries, etc.). Similar to the RES 108, the battery 122 may be coupled to the high voltage transformer 118 via an ESS inverter 124, which may convert DC power from the battery 122 to AC power, an ESS medium voltage transformer 126 to change the voltage of the AC power, and ESS cables 128 to transmit power from the ESS medium voltage transformer 126 to the high voltage transformer 118. Because the battery 122 may also receive power and store energy, power may flow through the ESS cables 128, the ESS medium voltage transformer 126, and the ESS inverter 124. The ESS inverter 124 may convert AC power to DC power for storage in the battery 122. The ESS 120 may include an ESS auxiliary load block 130, representing losses due to loads in the ESS 120, including loads from a battery management system (BMS), fire suppression, lighting, and other parasitic loads. These loads may be modeled in the ESS auxiliary load block 130 as fixed, constant losses. The high voltage transformer 118 may be coupled to a gen-tie 134 (e.g., a generator interconnect) which carries power from the high voltage transformer 118 to a point of interconnection 138 with a power grid. The energy system 106 may include a BTM load 140, which may receive power from the RES 108 and/or the battery 122. The BTM load 140 may be coupled to the first medium voltage transformer 114 and/or to the ESS medium voltage transformer 126, or to the inverter 110 and/or to the ESS inverter 124, such that power may be supplied directly from the power generation system 107 and/or the ESS 120 without first being supplied to the grid. Thus, the power generation system 107 and/or the ESS 120 may supply power to one or both of the grid or the BTM load 140 depending on various factors. The model 100 may include power demand schedules for both the BTM load 140 and the grid and use the demand schedules to determine and forecast the power flows in the system. For example, the energy system 106 may be contracted to supply all the power demanded by the BTM load 140 and may only supply power to the grid if there is additional power remaining after the BTM load demand is met. The model 100 may take into account the expected demand of the BTM load 140 and the contractual obligation when forecasting the power flows in the system 106.

The energy system 106 may include a site controller 136. The site controller 136 may manage energy generated by the RES. In some embodiments, the site controller 136 may cause a portion of the energy produced by the RES 108 to be delivered to the grid (e.g., via the gen-tie 134 and the point of interconnection 138), a portion to be delivered to a BTM load (e.g., BTM Load 140), and a portion to be used to charge the battery 122 of the ESS 120. The ESS 120 may also include a thermal management load block 132 representing losses due to thermal management of the battery 122 (e.g., representing the amount of power used to cool the battery 122). The thermal management losses may include idle losses and load losses. Idle losses may be losses that occur when the battery 122 is not charging or discharging and may be a function of weather, including, but not limited to, ambient temperature and system size. Load losses may be losses that occur at any time and may be a function of the ambient temperature and/or the power flow in the ESS. The thermal management losses may be calculated based on the type of cooling system, for example, an air-cooled system or a liquid-cooled system.

Losses at the ESS inverter 124 may be determined based on the efficiency curves provided by the supplier or manufacturer of the ESS inverter 124 as supplemented or replaced by the actual historical operational data. For example, a power curve correlating efficiency to normalized power may be provided. Efficiency of the ESS inverter 124 may be at a maximum at 60% of normalized power. In some embodiments, the system 106 may include a DC-DC converter to adjust the voltage of the DC power supplied from the battery 122 to the ESS inverter 124. The loss calculation for the ESS inverter 124 may take into account losses incurred by the DC-DC converter.

The ESS medium voltage transformer 126 may change the voltage of the AC power supplied by the battery 122 via the ESS inverter 124 before the AC power is supplied to the high voltage transformer 118. The voltage of the AC power from the ESS inverter 124 may depend on the state of charge of the battery 122. For example, the battery 122 may output a higher voltage of DC power when fully charged than when partially charged. The ESS inverter 124 may therefore output AC power at different voltages as needed to maximize efficiency. The losses at the ESS medium voltage transformer 126 may be calculated based on the level of transformer loading. The ESS medium voltage transformer 126 may be sized according to the maximum output voltage of the ESS inverter 124 and may be less efficient at lower voltages. The losses at the ESS medium voltage transformer 126 when the battery 122 discharging or discharging may be calculated according to the following formula:

$$MX\ xfrmr\ Loss(t_1) = Core \cdot loss + \left(\frac{P(t_1)}{P_{nominal}}\right)^2 \cdot \frac{xfrmr \cdot FLL - xfrmr \cdot NLL}{xfrmr\ ohmic\ loss}$$

The calculation may be performed each time the model 100 updates, with $t_1$ referring to the current time step. $P(t_1)$ refers to the estimated power at the ESS medium voltage transformer 126 at the time step $t_1$. $P_{Nominal}$ may refer to the nominal maximum power of the ESS medium voltage transformer 126. xfrmr.FLL may refer to the full-load loss of the ESS medium voltage transformer 126, which may be a fixed value associated with the particular transformer that may be provided by the transformer manufacturer. xfrmr.NLL may refer to the no-load loss of the ESS medium voltage transformer 126, which may be a fixed value associated with the particular transformer that may be provided by the transformer manufacturer or based on the historical operational data collected from the field. The difference between the full load loss and the no-load loss may be referred to as the ohmic loss of the transformer Core.loss may refer to a baseline loss whenever the battery 122 is charging or discharging. Thus, when the power ($P(t_1)$) at the ESS medium voltage transformer 126 approaches the nominal maximum power ($P_{Nominal}$), the transformer losses may approach the transformer ohmic loss plus the baseline loss (Core.loss). The ESS inverter 124 and the ESS medium voltage transformer 126 may be upsized in capacity to account for these losses. For example, to deliver and amount of power to the grid or another load, the power output by the battery 122 must exceed the delivered power to account for the losses. The ESS inverter 124 and the ESS medium voltage transformer 126 may need to be sized to handle the power output by the battery 122, rather than the power received at the grid or other load.

The ESS cables 128 may transmit power between the ESS medium voltage transformer 126 and the high voltage transformer 118. The losses at the ESS cables 128 at each time step ($t_1$) may be calculated according to the following formula:

$$\text{Cable Loss}(t_1) = \text{Cable} \cdot \text{Loss}_{Nominal} \cdot \left(\frac{P(t_1)}{\text{P\_Nominal}}\right)^2$$

Cable.Loss$_{Nominal}$ may refer to the nominal cable loss at the nominal maximum power ($P_{Nominal}$) of the ESS inverter 124. $P(t_1)$ may refer to the estimated current power at the ESS inverter 124 at the time step $t_1$. Thus, as the power ($P(t_1)$) approaches the nominal maximum power ($P_{Nominal}$), the losses at the ESS cables 128 may approach the nominal cable loss (Cable.Loss$_{Nominal}$). When the power ($P(t_1)$) is half of the nominal maximum power ($P_{Nominal}$), the losses may drop to one fourth of the nominal cable loss (Cable.Loss$_{Nominal}$).

The model 100 may be used to simulate the energy system 106, for example, to determine if the components (e.g., the battery 122, the RES 108) are sufficient to meet power delivery targets. For example, a powerplant owner or operator may want to install an energy system 106 including a solar RES 108 and an ESS 120 with a battery 122. The powerplant owner may want the energy system 106 to provide a first amount of power during the day (averaged over the course of a year) and a second amount of power at night (averaged over the course of the year). The model 100 may be used to determine how large the solar array of the solar RES 108 must be to deliver the average daily power, and how large the battery 122 must be to deliver the average nightly power. In addition to the losses discussed above, the model 100 may take into account numerous other factors to determine whether the energy system 106 is sufficient to meet power delivery goals of the powerplant owner and/or the power demands from BTM loads and the grid. The model 100 may also be used to determine the cost to operate the system over long periods of time.

For example, the model 100 may take into account degradation of the battery 122. The initial capacity of the battery 122 (e.g., in megawatt-hours) may degrade over time. The manufacturer of the battery 122 may provide a degradation schedule identifying a percentage of the initial capacity for the battery 122 in each subsequent year. For example, after one year, the capacity may drop to 99 percent; after two years the capacity may drop to 97 percent, etc. The model 100 may take into account the degradation in battery capacity to determine if the battery 122 will be sufficient to meet the average power targets for the energy system 106. The model 100 may update the capacity of the battery 122 in the simulation on the first day of the year, thus using an assumption that all of the degradation occurs at the beginning of the year. This may be more conservative than the actual degradation of a real battery, which degrades gradually over the course of the year. Alternatively, in some embodiments, the model may update the capacity of the battery 122 in the simulation more frequently, such as on the first day of each calendar quarter or even on a daily basis. The model 100 may assume the battery 122 to have reached its end of life (and to need replacing) when the battery reaches a minimum state-of-health limit (e.g., 50 percent of maximum capacity) or a maximum useful cell life as defined by the manufacturer (e.g., 25-35 years). When the model 100 is used to forecast the cost of the energy system 106, replacing of components like the battery 122 may thereby be accurately taken into account.

The model 100 may also take into account planned augmentation of the energy system 106, which may be built with future augmentation in mind (e.g., by including extra connection points to add additional batteries or solar panels). For example, the model 100 may be updated to take into account a planned installation of a second battery 122 after ten years of energy system 106 operation, when the first battery 122 is expected to reach a certain degradation level. Each battery 122 may have, for example, a 10 megawatt-hour capacity, and after ten years, the capacity of the first battery may drop to 8 megawatt-hours. For the first ten years, the model 100 may use the degradation schedule for the first battery 122 to update the capacity of the first battery 122 yearly as the capacity gradually drops from 10 to 8 megawatt-hours. Then at the beginning of the eleventh year, the model 100 may add the capacity of the second battery 122, and perform any calculations based on a total battery capacity of 18 megawatt-hours. The model 100 may use the same degradation schedule for the second battery 122 as the first battery 122, even though the second battery 122 will likely have an improved (e.g., slower) degradation rate due to 10 years of technological improvements to battery technology. This is another way to keep the model 100 conservative, so that the energy system 106 outperforms the model 100 rather than the opposite. The model 100 may stop simulating the ESS 120 when all of the batteries 122 have reached the end of their lives. As discussed above, the end of the life of a battery may be defined by a minimum state-of-health limit (e.g., 50 percent of maximum capacity) or a maximum useful cell life as defined by the manufacturer (e.g., 25-35 years). If the ESS 120 is being periodically augmented with new batteries to replace old batteries, the model 100 may continue simulating the energy system 106 as needed. Similar augmentations and calculations may be made for the RES 108. For example, solar panels may similarly degrade over time, producing less power, but the energy system 106 may be augmented in the future with additional solar panels. The model 100 may take into account the degradation and augmentation of the RES 108.

The flow of power in the energy system 106 simulated by the model 100 may be determined by a control schedule. The control schedule may be user defined based on the needs of customers (e.g., grid customers or a BTM load 140) or the operator of the energy system 106. The control schedule may determine whether energy generated by the RES 108 is supplied to one or more of the ESS 120, the BTM load 140, or the grid, and whether the ESS 120 should receive power from one or both of the RES 108 or the grid. For example, the control schedule may determine that, during the day, power should be supplied to the BTM load 140 until the demand of the BTM load 140 is met, and then any remaining power should be supplied to the ESS 120. Power may be supplied to the grid only when the demand from the BTM load 140 is met and when the ESS 120 is receiving a maximum amount of power or has reached its energy storage capacity. In the evening, the control schedule may determine that any power generated by the RES 108 or stored in the ESS should be supplied to the BTM load 140 until the demand of the BTM load 140 is met, and any remaining power should be supplied to the grid. In this example, the demands of the BTM load 140 are always prioritized, and power is supplied to the grid only when variable grid power prices may be at their highest or when the power produced by the RES 108 exceeds the demand from the BTM load and the capacity limits of the ESS. In other embodiments, control schedules may prioritize supplying power to the grid over supplying power to the BTM load 140. For example, the control schedule may determine that power should preferentially be supplied to the BTM load 140 when the flat rate pricing of the BTM load 140 exceeds the variable grid power price, but power should preferentially be supplied to the grid when the variable grid power price exceeds the flat rate pricing of the BTM load 140.

The ESS 120 may also have its own control schedule, which may operate in conjunction with or independently of the energy system 106 control schedule. The control schedule of the ESS 120 may be set based on state of charge (SOC) targets of the batteries 122, which effectively defines the charging and discharging time windows. For example, the control schedule may specify that the batteries 122 should be at 0 percent SOC by 8:00 AM, 95 percent SOC by 2:00 PM, and 0 percent SOC by 9:00 PM. This would result in the batteries 122 charging through the morning and early afternoon and then discharging through 9:00 PM as the sun goes down and the power produced by the solar panels decreases. The ESS 120 control schedule may vary by day, week, or month. For example, the control schedule may be set such that the batteries 122 may continue charging later in the day during the summer when the sun is up for longer and may discharge until later at night. The charge and discharge rates of the batteries 122 may be assumed in the model 100 to be constant over the charging period, as the control system of the actual batteries will similarly aim to charge and discharge the batteries at a constant rate, which may minimize battery cell degradation. The model 100 may optionally allow the batteries 122 to be charged from clipped power from the RES 108. When charging from clipped power is allowed, the model may prioritize charging from clipped power rather than power that would otherwise be supplied to the grid or another load. The model 100 may also take into account losses due to backfeed loads in the ESS 120 that need to be powered when the battery 122 is not charging or discharging. These losses can be fed by the RES 108, purchased from the grid, or offset by power supplied by the battery 122 when the battery 122 discharges.

The model 100 may take into account expected ESS 120 downtime. For example, the batteries 122 may need annual maintenance requiring the ESS 120 to be disconnected from the energy system 106. An average expected downtime for the year may be determined, and the power capacity (e.g., in megawatts) and energy storage capacity (e.g., in megawatt-hours) of the energy system 106 may be adjusted (e.g., derated) based on the average expected downtime.

The model 100 may be used to determine the round-trip efficiency (RTE) of the ESS 120. The RTE calculation may take into account all of the components of the ESS and their respective efficiencies and losses. In general, RTE may be calculated by dividing the energy going into the ESS 120 by the energy going out of the ESS 120. The RTE may be calculated at an RTE measurement point between the ESS cables 128 and the high voltage transformer 118. The model may be used to calculate a "simple RTE," which may be calculated by dividing the power discharged from the ESS 120 by the power supplied to the ESS 120 in a single charge/discharge cycle of the battery 122, excluding idle losses. The model may also be used to calculate a "24-hour RTE," which may be calculated by dividing the power discharged from the ESS 120 by the power supplied to the ESS 120 during an average operational 24-hour day, including all idle losses during this period.

Figure 2:
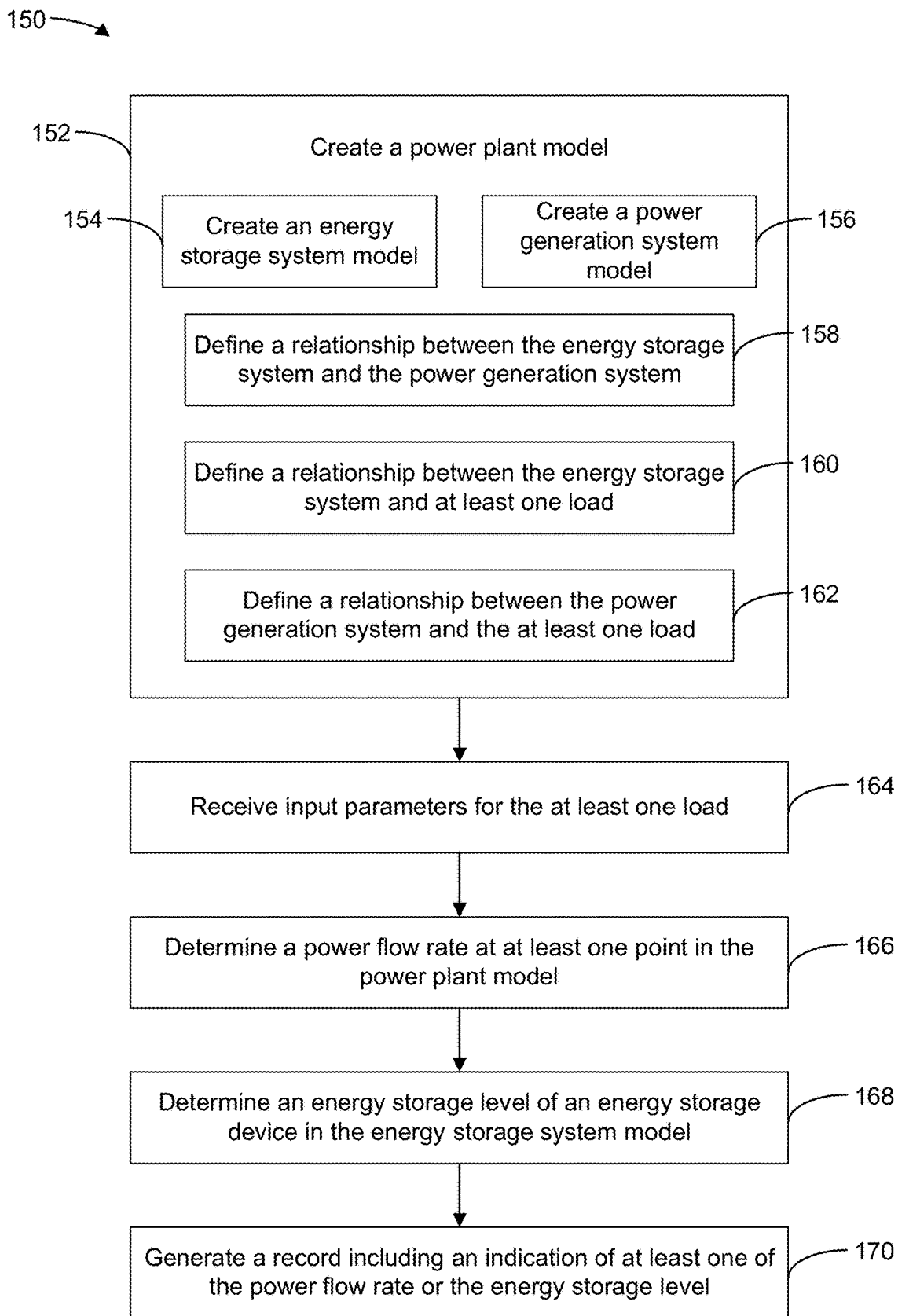
FIG. 2 is an example flow diagram of an example method of determining power flows in a power plant using the modeling tool of FIG. 1, according to some embodiments.

Referring now to FIG. 2, a method 150 of determining power flows in a power plant is shown, according to some embodiments. The method 150 may include creating a model of the power plant (e.g., the model 100) and using the model to determine power flows at various points in the power plant at different time steps as well as different energy storage levels of energy storage devices (e.g., the SOC of a battery). At operation 152 of the method 150, a power plant model (e.g., the model 100) may be created. Creating the power plant model in operation 152 may include several sub-operations 154-162. At operation 154, an ESS model (e.g., a model of the ESS 120) may be created within the power plant model. The ESS model may include a first set of equipment models (e.g., the inverter model 124, the transformer model 126, etc.) corresponding to components of the ESS. The first set of equipment models may include an energy storage device model corresponding to energy storage device. The energy storage device may be a battery (e.g., the battery 122). The equipment models may include various information about the respective components. For example, a battery equipment model may include a degradation schedule indicating a reduction in battery charge capacity with increasing age of the battery. As another example, a transformer equipment model may include a power loss curve indicating an amount of power loss based on the amount of power flowing through a transformer. As another example, the cable equipment model may include a length of the corresponding cable and expected amount of electric resistance based on the length. These examples are not exhaustive, and the equipment model may include any information relevant to the associated component. Some equipment models may be representative of one or more loads or losses in the power plant rather than being representative of a specific component. For example, equipment models of auxiliary loads of an ESS may represent various auxiliary loads required to operate a battery or other components in the ESS. In some embodiments, these loads may be included in the battery equipment model rather than in a separate auxiliary load equipment model.

The ESS model may further include relationships between the equipment (e.g., components) in the ESS model (e.g., equipment relationships). For example, one equipment relationship may be that a battery is coupled to an inverter and configured to convert DC power from the battery to AC power. Another equipment relationship may be that the inverter is coupled to cables configured to carry the AC power from the transformer to another location. Another equipment relationship may be that an auxiliary load causes a loss associated with charging and discharging the battery. Another equipment relationship may be a distance between two components. For example, the distance between two batteries in an ESS may affect the thermal management of the batteries. Equipment relationships may also include installation dates, replacement dates, and end-of-life dates. For example, an equipment relationship between a first ESS and a second ESS may be that the first ESS is installed in year 1, the second ESS is installed in year 5, and the first ESS reaches an end-of-life at year 10. An equipment relationship between the first ESS and a third ESS may be that the third ESS replaces the first ESS at year 10. A component may have a relationship to a second component through a third component. For example, an equipment relationship may be that a RES is connected to a power grid via a transformer and a cable. These examples are not exhaustive, and any relationships between components in the ESS are contemplated herein.

At operation 156 of the method 152, a power generation system model (e.g., the power generation system model 107) may be created within the power plant model. The power generation system model may include a second set of equipment models (e.g., the inverter model 124, the transformer model 126, etc.) corresponding to components of the power generation system. The second set of equipment models may include a power source model corresponding to a power source. The power source may be a RES (e.g., the RES 108), such as a solar panel array, one or more wind turbines, a coal-fired power plant, a nuclear power plant, a non-renewable power source, or any other type of equipment capable of generating electrical power. Like the equipment models of the ESS model, the equipment models of the power generation system model may include various information about the respective components. As discussed above, the equipment models may include degradation schedules and loss curves. The equipment model of an RES may include, for example, a number of solar panels, a weather forecast indicating expected amounts of sunshine in a future time period or periods, a degradation schedule indicating a reduction in power production based on the age of the RES, a station power requirement, or any other information relevant to the RES. Like in the ESS model, some equipment models may be representative of one or more loads or losses in the power plant rather than being representative of a specific component.

The power generation system model may further include equipment relationships between the components in the power generation system model. For example, one equipment relationship may be that a RES is coupled to an inverter configured to convert DC power from the RES to AC power. Another equipment relationship may be that the inverter is coupled to cables configured to carry the AC power from the transformer to another location. Another equipment relationship may be that an auxiliary load causes a loss associated with the power production of the RES. Another equipment relationship may be a distance between or a relative position of two components. These examples are not exhaustive, and any equipment relationships between components in the power generation system are contemplated herein.

At operation 158 of the method 150, a relationship between the ESS and the power generation system may be defined (e.g., a system relationship). For example, the system relationship between the ESS and the power generation system may be that cables from a power generation system may be coupled to a battery inverter of the ESS, such that power generated by the RES can be stored in a battery of the ESS. Another system relationship between the ESS and the power generation system may be that both the ESS and the power generation system are coupled to a transformer that is coupled to a power grid. For example, as shown in the energy system 106 of FIG. 1, both the power generation system 107 and the ESS 120 are coupled to the high voltage transformer 118. Another system relationship between the ESS and the power generation system may be that both the ESS and power generation system may be configured to supply power to a BTM load. Another system relationship between the ESS system and power generation system may be that the ESS is configured to supply station power to the RES of the power generation system. Another system relationship between the ESS and the power generation system may be that both the ESS as in the power generation system may be coupled to a power grid at separate locations. The system relationship may include the distance that power generated by the RES must travel via the power grid to reach the ESS. These examples are not exhaustive, and any and all possible system relationships between the ESS and the power generation system are contemplated herein.

At operation 160 of the method 150, a system relationship between the ESS and at least one load may be defined. The method 150 may also include creating one or more load models of loads configured to receive power from the power plant and including the load models in the power plant model. The load models may include a schedule of expected power demand from the associated load based on time of day, weather, time of year, etc. One example of a system relationship between the ESS a load may be that the ESS is configured to supply power directly to a BTM load. As another example, the system relationship between the ESS and a load may be that the ESS is configured to supply power to a load via a power grid. The system relationship may include the distance the power output by the ESS must travel across the power grid to reach the load. These examples are not exhaustive, and any and all possible system relationships between the ESS and the load are contemplated herein. At operation 162 of the method 150, a system relationship between the power generation system and at least one load may be defined. For example, the system relationship between the power generation system and a load may be that the power generation system is configured to supply power directly to a BTM load. The BTM load may be, for example, the same BTM load to which the ESS is configured to supply power, or may be a different BTM load. As another example, the system relationship between the power generation system and a load may be that the power generation system is configured to supply power to a load via a power grid. The system relationship may include the distance the power output by the power generation system must travel across the power grid to reach the load. These examples are not exhaustive, and any system relationships between the power generation system and the load are contemplated herein.

At operation 164 of the method 150, input parameters of at least one load may be received. The input parameters may include one or more demand schedules for a load. For example, the demand schedules may indicate the amount of power required by the load at various times of the day, week, month, or year. The demand schedules may be based on expected demand from wholesale power purchasers. For example, historical data may be used to estimate the expected amount of demand from a power grid at various times of the day. The demand schedules may further include power price information, for example, the amount the wholesale power purchaser will pay for power at certain times of the day. Alternatively, the demand schedules may be based on contractual agreements. For example, a BTM load 140 (e.g., a factory) may have an agreement with the power producer that the power plant will provide a specific minimum amount of power at certain times of the day for a pre-negotiated fixed price. The input parameters, components of each system, and relationships may be defined by a user via a user interface. The equipment models may be retrieved from a database of equipment models.

At operation 166 of the method 150, a power flow rate for at least one point in the power plant model may be determined. At operation 168 of the method 150, an energy storage level of the energy storage device (e.g., the SOC of a battery) may be determined. The power flow rate and/or the energy storage level may be determined based on the input parameters of at least one load, the models in the power plant model (e.g., the equipment models, the ESS model, and the power generation system model), and the relationships and the power plant model (e.g., the equipment relationships between the components of the systems, the system relationship between the energy storage system available power determination system, the system relationship between the ESS and a load, and the system relationship between the power generation system one load). For example, a power plant model may be established with an ESS and a power generation system each coupled to a single BTM load. Based on the power generation system model, the ESS model, the relationships, and the demand schedules of the BTM load, the power flow rate may be determined at several points in the power plant model. For example, the amount of power flowing out of a RES may be determined, an amount of power flowing into the BTM load may be determined, and an amount of power flowing into or out of a battery may be determined. Similarly, the SOC of the battery may be determined based on the amount of power flowing into and out of a battery. In some embodiments, the model may be used to maximize revenue for the power plant or otherwise optimize the power plant based on the demand schedules of at least one load. For example, if the power plant is coupled to two loads, the power plant model may be used to determine that power should be supplied to the load that will pay a higher price for the power. The power plant model may take into account future demand schedules, for example, rather than discharging a battery to supply power to a power grid during low demand periods, the battery may remain charged until the demand and the price received for power increases.

At operation 170 of the method 150, a record (e.g., a file, document, table, listing, message, notification, etc.) may be generated including an indication of at least one of the determined flow rate and/or energy storage level. Generating the record may include storing a modified version of the network model in a database. This may allow a user to quickly retrieve the information at a later time. For example, the method 150 may be performed in advance of a request from a user via a user interface, and the results may be stored in the database. When the user requests the power flows of a system after modifying an attribute, the results may be pulled from the database, and the method 150 may not need to be performed after receiving the request. Generating the record may include displaying the indication of the power flow rate and/or the energy storage level on the user interface. For example, the user interface may include a graphical representation of the power plant model, and the power flow rate and/or energy storage level may be displayed numerically or graphically on the model, for example, superimposed on the location of the relevant energy storage device or power flow point. In some embodiments, the method 150 may include more or fewer operations than described above. For example, the method 150 may only include one of operations 166 or 168. In some embodiments, the method 150 may not include operation 152, as the model may have been previously generated. Instead, the method 150 may begin with operation 164. In some embodiments, operation 152 may include modifying a previously-generated model (e.g., by modifying relationships or component models) rather than creating a new power plant model.

The power plant model may be used to create a long-range revenue or profit estimate. For example, the input parameters for a load may include demand schedules extending 10, 20, 30, or more years into the future. Similarly, degradation schedules for components, replacement and maintenance schedules for components, and system augmentation schedules, may extend 10, 20, or more years into the future. As an example, a user may create a power plant model of a power plant including a power generation system with a solar RES, an ESS with a battery, and a single BTM load to estimate revenue over a ten-year period. The power generation system may be configured to supply power to the ESS and the BTM load, and the ESS may be configured to receive power from the power generation system and supply power to the BTM load. The power generation system model may include a ten-year degradation schedule for the RES model, long-range weather forecasts that affect power production of the RES, station power requirements, and power loss curves for inverters and transformers. The ESS model may include a ten-year degradation schedule for each battery, long-range weather forecasts that affect the storage capacity of the battery, expected future energy demand, RES energy production, and ESS energy storage, auxiliary power requirements, and power loss curves for inverters and transformers. The user may enter a ten-year expected demand schedule for the BTM load, which may include a price schedule, market based or linked prices or a fixed price for power. Based on the models and the demand schedule, the total amount of revenue produced over the ten-year period may be determined or estimated. The revenue for a specific time periods, for example, the daily revenue for each day in the ten-year period, may be determined or estimated. The installation costs and financing costs may be calculated in order to determine or estimate profits over the ten-year period. The user may alter the model based on updated information to determine the effects on revenue and profits. For example, the user may indicate that the battery will be replaced at year 5 instead of year 10. The model may be used to determine whether the battery replacement cost outweighs the additional revenue generated due to the increased storage capacity of the newer, less degraded battery.

Optimization of a Power Plant Network

Power plant operators may be responsible for multiple power plants, which may be geographically dispersed and technologically diverse. Further, power plant operators are increasingly turning from fixed-price power purchase agreements to hybrid agreements in which the energy produced or stored by the power plants may be delivered to wholesale electricity markets, specific offtakers, and BTM loads. Contractual obligations, rate structures, and energy efficiency may all affect how and where the power plant operator supplies energy. For example, at certain times of the day, it may be optimal to supply RES-generated power to a BTM load from a first power plant, while RES-generated power from a second power plant is used to charge an ESS. At another time of the day, wholesale power price may exceed contractual price from other offtakers, and it may be optimal to supply power from both RESs and the ESS to the grid.

A simulation model, similar to the model 100 discussed above, may be used to optimize power flow to and from various power plants controlled by the same operator (e.g., a network of power plants), according to some embodiments. Each power plant may be modeled similarly to the energy system 106 described above with respect to the model 100 and included in a model of a power plant network. The simulation model may include equipment models of power plant equipment and stored relationships between the equipment. The equipment models and relationships may be included in a model of a power plant. The simulation model may include relationships between the power plant models and relationships between the power plant models and load models, forming a network model of a network of power plants. Through the stored relationships, the network model may enable the simulation of the network of power plants to determine the flow of energy and the effects of changes to equipment models and relationships. The simulation model (e.g., the network model) may be used to plan future power plant installations and/or to analyze and optimize the performance of a network of currently-operating power plants. In some embodiments, the power plant models may be digital twins (i.e., a digital representation of an intended or actual real-world a physical power plant that serves as its digital counterpart for simulation, integration, testing, monitoring, maintenance, etc.) of currently-operating power plants that receive real data from various sensors and equipment of the power plant. In other embodiments, the power plant models may use calculated assumptions or estimations regarding efficiency, power losses, and equipment degradation, as discussed above with respect to the model 100, to predict the future operation of the network of power plants as equipment degrades, power plants are added to the network, and/or power demand changes. The simulation model may include a calculation tool to determine the optimal power flow in the energy system.

Figure 3:
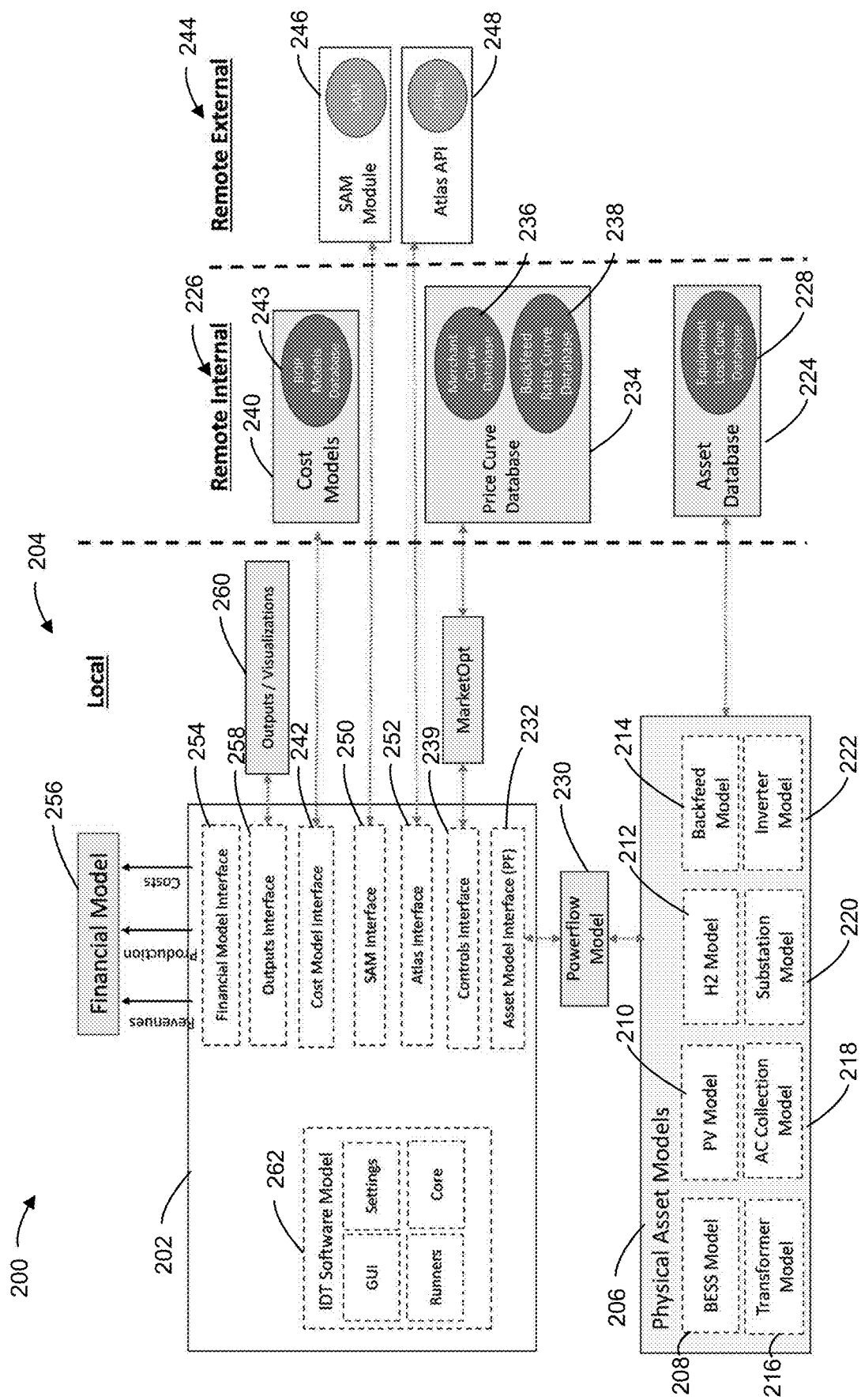
FIG. 3 is a system for simulating a power plant or network of power plants, according to some embodiments.

Referring now to FIG. 3, the architecture of a simulation system 200 is shown, according to some embodiments. The simulation system 200 may include a calculation tool 202 configured to receive various data and to determine the optimal power flow in an energy system. The calculation tool 202 may operate on a local server 204 and may include at least one processor and at least one local memory. The local server 204 may also process physical asset models 206, which may include models of the physical power plant equipment (e.g., similar to the model 100 or the various components of the model 100). The physical asset models 206 may include, for example, battery models 208, photovoltaic RES models 210, hydrogen power plant models 212, transformer models 216, substation models 220, and/or inverter models 222 that each simulate or track the power flow through the respective equipment (e.g., batteries, RESs, transformers, substations, etc.). The physical asset models 206 may include backfeed models 214 to model the flow of power to a power plant (e.g., station power, power needed to charge the ESS, etc.) and AC collection models 218 to model the collection of power from each of the photovoltaic modules. The physical asset models 206 used in a particular energy system model may be pulled from an asset database 224 containing models of a variety of physical assets. The asset database 224 may be stored on a remote internal server 226. The asset database 224 may include a loss curve database 228 storing loss curve information and degradation schedules for the physical assets. For example, loss curve database 228 may store power loss curves for inverters and transformers based on the amount of power flowing therethrough and may include degradation tables for batteries and photovoltaic modules. The various physical asset models 206 included in the simulation system 200 may be assembled into a collective power flow model 230, which may be similar to the power plant model 100 or which may include a power plant network model including multiple power plant models of power plants in a network or power plants operated by the same operator. The power flow model 230 may be supplied to an asset model interface 232 of the calculation tool 202.

The simulation system 200 may include a price curve database 234 which may be stored on the remote internal server 226 and supply information to a controls interface 239 of the calculation tool 202. The price curve database 234 may include a merchant curve database 236. The merchant curve database 236 may store information (e.g., price curves) about the prices that energy merchants will pay for power from energy system. For example, an operator of a wholesale power grid may be charged variable prices depending on demand. The price curve database may also include price curves for customers with power purchase agreements, such as operators of BTM loads. BTM customers may be charged flat rate prices or otherwise structured rate prices rather than being charged variable prices based on demand. The calculation tool 202 may use the price curves to determine to which customers power will be supplied. For example, when the flat price for power supplied to the BTM customer exceeds the wholesale market price, power may be supplied to the BTM customer first before any power is supplied to the wholesale power grid. When the variable price paid by the wholesale power grid exceeds the flat price paid by the BTM customer, power may be supplied to the power grid first before power is supplied to the BTM customer. The calculation tool 202 may also take into account contractual obligations and penalties. For example, the power plant operator may be obligated to supply a minimum daily amount of power to the BTM customer or pay a penalty for failing to supply the minimum daily amount of power. The calculation tool 202 may determine whether the wholesale market price exceeds the flat price paid by the BTM customer by enough to justify undersupplying the BTM customer and paying the penalty. While these calculations may be relatively simple with a single power plant, when the energy system includes multiple power plants in various geographical locations, it can become more complex to determine the optimal distribution of power from the power plants, especially when the possibility of wheeling of power is taken into account. The calculation tool 202 uses the power flow model 230 and the price curves to optimize the distribution of power.

The price curve database 234 may also include a backfeed price curve database 238. The backfeed price curve database 238 may store price curves for power that may be purchased by the power plants for station power and other operating power needs, for example, when the power plant is not generating power. The calculation tool 202 may determine the best source from which the purchase power or whether it will be more cost-efficient to use stored power in an ESS to supply backfeed power.

The simulation system 200 may include a cost model database 240 which may be stored on the remote internal server 226 and supply information to a cost model interface 242 of the calculation tool 202. The cost model database 240 may include models of the costs of financing, purchasing, installing, and operating various equipment in a power plant. The cost model database 240 may include a balance of plant models database 243, which may include models of the cost to supply-balance of-plant power to the power plants. The simulation system 200 may also include a remote external server 244 including a SAM (System Advisor Model) module 246 and an Atlas Database (a database of relevant attributes of power plants, whether already in operation or in construction or in development) 248, which communicate with a SAM interface 250 and an Atlas interface 252 of the calculation tool 202. The calculation tool 202 may include a financial model interface 254 which outputs information (e.g., revenue, power production, costs, etc.) to generate a financial model 256. The calculation tool 202 may include an outputs interface 258, which may output various information and visualizations 260 via a graphical user interface.

The calculation tool 202 may be configured to conduct a point analysis of individual facilities in the energy system (e.g., power plants, stand-alone ESS systems, etc.). The calculation tool 202 may receive a power flow model 230 of a single facility and generate a set of outputs for the facility, which may include, for each time period of the time window being assessed, energy production, power flows at various points of the system, state of charge for any ESS in the system, and projected revenues and costs. The point analysis may be used to update performance and financial projections for a facility whose design has been finalized based on updated information affecting the facility. The information may include updated subsystem technical capabilities and performance, long-term weather forecasts, changes to actual cost or cost projections for capital equipment or operations, or financing costs. Point analysis may simulate and identify synergies between subsystems in the facility. For example, the cost of adding an ESS to a REPP to supply power to a BTM load when a RES is not producing power may not be economically justified. However, point analysis conducted by the calculation tool may determine that it may be financially advantageous to add an ESS in order to supply power to a power grid during high-demand time periods. If the calculation tool 202 determines that it is financially advantageous to add the ESS to supply power to the power grid, the ESS may also supply power to the BTM load, further improving system efficiency and increasing the financial advantage of adding the ESS. The calculation tool 202 may simulate and quantify these possibilities to optimize the design of the facility.

The calculation tool 202 may perform a performance sweep in which a series of point analyses are conducted in which one or more selected input parameters is varied in increments across predefined ranges. By conducting the performance sweep, the calculation tool 202 may identify the optimal engineering design of the facility. Aside from varying the operational parameters of the equipment in a facility, the performance sweep may also be used to determine optimal financing structures. For example, the input parameters that vary during the performance sweep may be financing parameters rather than operational parameters. The financing performance sweep may be used to characterize impacts on owner and investor returns and financial risk.

The calculation tool 202 may also perform point analyses and performance sweeps of a network of facilities rather than an individual facility. Like the individual facility point analysis, the calculation tool 202 may receive a power flow model 230. However, in the network-of-facilities point analysis, the power flow model 230 may include a network of facilities. The calculation tool 202 may analyze the power flow model 230 and generate a set of outputs for each facility, which may include, for each time period of the time window being assessed, energy production from each facility, power flows at various points in each facility, state of charge for any ESSs in the facilities, and projected revenues and costs. The calculation tool 202 may help to identify synergies between facilities to determine the optimal power flow from each facility. For example, the calculation tool 202 may determine that the network of facilities may deliver power to the load more efficiently if two of the facilities supply power to the load rather than supplying all of the power from one facility. Where the energy system includes several power plants and/or stand-alone ESSs and several loads, all distributed over a wide geographical area, these calculations may be difficult to perform without the modeling capabilities of the simulation system 200. Existing simulation tools that are only capable of simulating a single facility will not be able to identify these synergies, the value of which depends not only on the characteristics of each facility but on the relationships between the facilities and between the facilities and the loads.

The calculation tool 202 may perform a performance sweep on a network of facilities, similar to the performance sweep performed on an individual facility. As in the performance of an individual facility, one or more selected input parameters may be varied in increments across predefined ranges to determine the optimal value for each parameter. In some cases, the performance sweep of the network of facilities may include varying parameters at only a single facility, so that the design of a facility being added to an existing network can be optimized. Unlike the analysis for a standalone facility, the analysis of a new facility being added to a network may take into account the effects of the other facilities in the network. For example, in a network of facilities in which the loads require additional power during the day but not at night, the calculation tool 202 may determine that a new wind facility added to the network may not need an ESS. In some cases, the performance sweep of the network of facilities may include characterizing implications for investor returns and investment risks across the entire network of facilities due to variations in long-term weather forecasts, engineering models for equipment performance, and cost models for equipment and financing. For example, an increase in the cost of batteries may affect the cost to augment or replace existing batteries in ESSs across the network. Similarly, updated degradation models for solar panels based on updated manufacturer testing may affect power output projections and estimates across solar facilities throughout the network. The performance sweep may allow the calculation tool 202 to determine the effects of these changes on revenues and costs. In some cases, the performance sweep of the network of facilities may include determining the effects across the network caused by varying parameters in a single facility. For example, the network sweep may analyze the effects across a network of facilities from adding solar capacity to a first facility. The calculation tool 202 may determine that the revenue increase at the first facility is partially offset by a decrease in revenue at the other facilities in the network. Further evaluation may be performed, including determining installation and financing costs, to determine if adding the solar capacity to the first facility is justified.

Point analysis and sweeps may be computationally intensive, as a network of facilities may include several facilities, each with numerous points, each of which may need to be analyzed at different values during a sweep. The computational delay may make it difficult for the calculation tool 202 to provide analysis in "real-time." To provide faster results for requested analyses, the calculation tool 202 can be configured to record a set of facilities to be analyzed, as well as sets of point analyses, sweeps, network point analyses, and network sweeps to be conducted. The calculation tool 202 can then perform these analyses in the background, prior to receiving a specific request for the analytic results, and can store the results in a database. When analysis is requested, the calculation tool 202 can retrieve the results from the database with virtually no delay. In some cases, an analysis may be requested which has not already been performed, in which case, the calculation tool 202 may have to perform the analysis after receiving the request.

In some cases, changes to equipment parameters or performance data may affect equipment across the network. The relevant databases (e.g., the asset database 224, the SAM module 246, the Atlas Database 248, etc.) may be updated and each facility incorporating the relevant equipment may pull in the new data and be updated. For example, updated testing data may result in an update to a loss curve for a particular type of inverter installed in several facilities. Rather than updating the model for each of the affected facilities, the asset database 224 may be updated with the new loss curve, and each facility incorporating that type of inverter may pull the new data from the asset database 224. The calculation tool 202 may then re-perform previous analyses using the updated inverter information to keep the analysis database up to date. In some embodiments, the calculation tool 202 may re-perform analyses only on facilities affected by the updated database. In other embodiments, the calculation tool 202 may re-perform analyses on the entire network of facilities.

The calculation tool 202 may further be configured to track equipment needs and coordinate logistics for future facility installations. Once a facility design has been established based on the simulation model, the design may be identified as the design of record. While future changes in parameters may result in design changes, the design of record may be the most current design, which the facility operators would plan to go forward with if no further changes were needed. The calculation tool 202 may track the types and quantities of each type of equipment (e.g., inverters, solar panels, transformers, etc.) needed for the facility as designed. The calculation tool 202 may record key dates for the project, including a projected entry-into-service date, which provide the anchor points around which the project development timeline may be constructed. Similar data (e.g., types and quantities of equipment needed, key dates, etc.) may be recorded for all facilities which have a design of record approved for installation. This information can be used for logistics and procurement planning, procurement negotiations, and project planning. For example, an operator planning to install multiple facilities may place a bulk order for inverters or solar panels rather than separate smaller orders. This may give the operator leverage for negotiating the price of the equipment. The calculation tool 202 can also determine when the equipment will need to be delivered to each installation site before the project timeline is delayed. For example, the calculation tool 202 may determine that a first facility will need solar panels delivered before a second facility needs solar panels to meet a target entry-into-service date, and a delivery schedule can be coordinated accordingly. If a supplier is unable to supply enough panels to meet the schedule of both facilities, the calculation tool may perform performance sweeps to determine which facility will be least affected by a delayed installation. For example, if two facilities are scheduled to have the same entry-into-service date, and a first facility has a higher contractual penalty for late entry into service, the calculation tool 202 may determine that the available solar panels should be delivered to the first facility rather than the second facility.

The calculation tool 202 may also be connected to a server containing Geographic Information System (GIS) data. GIS data may include information about the land on which a solar panel array is planned to be installed, such as topographical data, locations of streams, lakes, and wetlands, buildings on the land, mining operations on the land, and areas containing protected wildlife species. The GIS data may also include information about the type of soil in the area, which may affect the cost and difficulty of installing solar modules. For example, soil hardness may affect the cost of pile driving for support posts, and soil humidity and chemistry may affect the expected corrosion rate of the support posts, which can in turn affect the required material thickness required to provide sufficient useful life. The calculation tool 202 may use the GIS data to plan a solar panel array layout and determine installation and productivity of the array. The calculation tool 202 may thus ensure that there is adequate (but not excessive) land in the selected parcel to install enough panels to produce the desired amount of power, while also satisfying other geographic constraints such as setback requirements, maintenance road requirements, and protection of ecologically sensitive areas. The calculation tool 202 may also use the GIS data to improve the accuracy of the facility design. For example, the calculation tool 202 may determine that additional solar panels may be needed to achieve the desired power output due to shade caused by the topology of the land at certain times of day. The calculation tool 202 may also determine that additional cables will be required because some of the solar panels should optimally be placed farther apart than anticipated. The calculation tool 202 may thus significantly reduce the amount of engineering time spent iterating plant designs and planning land acquisition.

The calculation tool 202 may include a software module 262 configured to generate graphical user interfaces which a user may use to create the power flow model 230, adjust settings of the simulation system, modify attributes of equipment models, modify relationships between equipment models, power plants, and loads, or input values for point analyses and performance sweeps.

Figure 4:
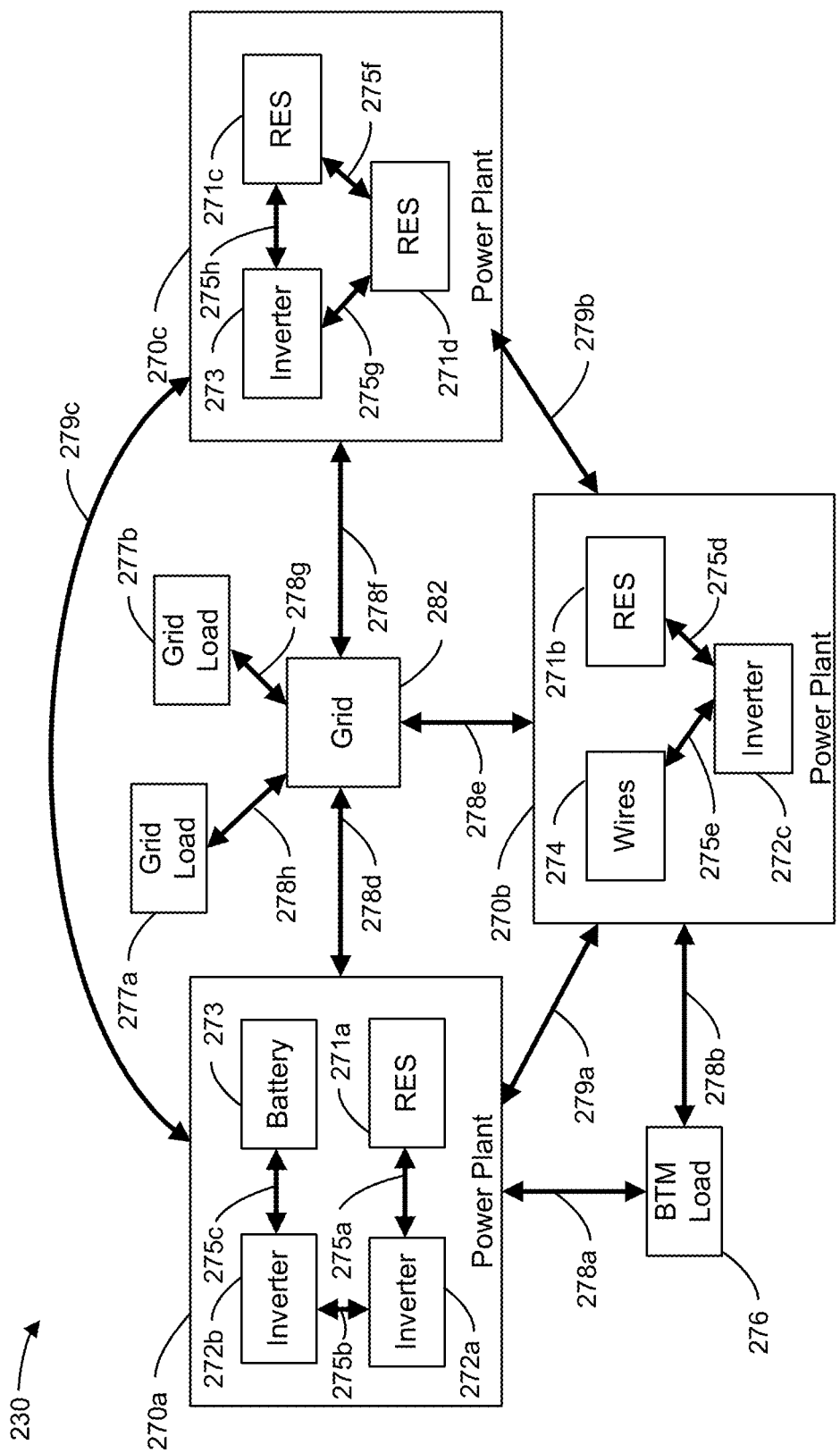
FIG. 4 is a schematic diagram of a power flow model for modeling the flow of power in a power plant using the simulation system of FIG. 3, according to some embodiments.

Referring now to FIG. 4, an example power flow model 230 of a network of power plants (e.g., a network model) is shown, according to some embodiments. The power flow model 230 may include power plant models 270 (e.g., 270a, 270b, 270c) corresponding to power plants in the network of power plants. The example power flow model 230 can be a graph data structure. Each power plant model may be substantially similar to the model 100 described above with respect to FIG. 1. Specifically, each power plant model 270 may include one or more equipment models 271-274 corresponding to components (e.g., equipment) of the respective power plant. In some embodiments, the equipment models may represent losses associated with power plant equipment, rather than specific equipment. For example, as discussed above, the ESS auxiliary load block 130 may be an equipment model representing losses due to loads in the ESS 120. Each power plant model 270 may further include relationships between the equipment (e.g., equipment relationships), as described above with respect to FIG. 2. The arrows 275 may indicate relationships between the equipment models 271-274, representing relationships between equipment models in the power plants. For example, the power plant model 270a may include an RES model 271a, two inverter models 282a, 272b, and a battery model 273. The relationship indicated by the arrow 275a may be that the inverter represented by the inverter model 272a is configured to receive DC power generated by the RES represented by the RES model 271a and convert it to AC power. The relationship indicated by the arrow 275b may be that the inverter represented by the inverter model 272b is configured to receive the AC power from the inverter represented by the inverter model 272a and convert it to DC power. The relationship indicated by the arrow 275c may be that the inverter model 272b is configured to supply the DC power to a battery. The power plant model 270b may include an RES model 271b, an inverter model 272c, and a wires model 274. The relationship indicated by the arrow 275d may be that the inverter represented by the inverter model 272c is configured to receive DC power generated by the RES represented by the RES model 271b and convert it to AC power. The relationship indicated by the arrow 275e may be that the wires represented by the wires model 274 are configured carry the AC power from the inverter represented by the inverter model 272c to a point of interconnection. The power plant model 270c may include two RES models 271c, 271d, and an inverter model 272d inverter model 272c, and a wires model 274. The relationship indicated by the arrow 275f may be that the inverter represented by the inverter model 272d is configured to receive DC power generated by the RES represented by the RES model 271c and convert it to AC power. The relationship indicated by the arrow 275g may be that the inverter represented by the inverter model 272d is configured to receive DC power generated by the RES represented by the RES model 271d and convert it to AC power. The relationship indicated by the arrow 275h may be that the RES represented by the RES model 271c and the RES represented by the RES model 271d share a common inverter and may each be configured to supply station power to each other when needed.

The power flow model 230 may include plant relationships between the power plant models 270 and plant-load relationships between the power plant models load models 276, 277a, 277b which represent loads coupled to the power plants. The arrows 279 may indicate the plant relations relationships and the arrows 278 may represent the plant-load relationships. For example, plant-load relationships indicated by the arrows 278a and 278b may respectively be that the power plant models 270a and 270b are both configured to supply power to the BTM load represented by the BTM load model 276. The plant-load relationships indicated by the arrows 278d-278h may relate to the connection of each power plant (represented by the power plant models 270a, 270b, 270c) to grid loads represented by the grid load models 277a, 277b via a power grid represented by a power grid model 282. For example, the plant-load relationships represented by the arrows 278d-278h may be that each power plant (represented by the power plant models 270a, 270b, 270c) may be configured to supply power to the grid loads represented by the grid load models 277a, 277b via a power grid represented by a power grid model 282. The relationship may include a distance between each grid load and each power plant via the grid. For example, the grid load represented by the grid load model 277a may be closer to the power plant represented by the power plant model 270a than to the power plant represented by the power plant model 270c, such that power may not have to travel as far over the grid. Thus, the transmission losses from the power plant represented by the power plant model 270a may be lower than the transmission losses from the power plant represented by the power plant model 270c. The plant-load relationships 278 may include constraints on the transmission of power between components of the power flow model 230. For example, there may be a limit to how much power may be transmitted from the power plant represented by the power plant model 270a to the power grid represented by the grid model 282 (e.g., due to physical limitations of transmission lines). These limits may vary over time, for example, due to power from other sources being transmitted over a common transmission line. These limits may be asymmetrical; for example, the amount of power that can be supplied from the power plant represented by power plant model 270a to the power grid represented by the grid model 282 may be different than the amount of power that can be supplied from the power grid represented by the grid model 282 to the power plant represented by the power plant model 270a. This asymmetry may also vary over time.

The plant relationship indicated by the arrow 278a may be that the power plant represented by the power plant model 270a and the power plant represented by the power plant model 270b are each configured to supply power to the BTM load represented by the BTM load model 276 and, therefore, an increase in power supplied by one power plant to meet the demand of the BTM load may allow the power supplied by the other power plant to be reduced. Each plant relationship indicated by the arrows 278a, 278b, 278c may be that the power plants represented by the power plant models 270a, 270b, 270c are connected via the grid, and therefore each power plant may supply power to or receive power from the other power plants. For example, one power plant may supply station power to another power plant that is not producing sufficient power. As another example, a first power plant may supply power to a second power plant to charge a battery of an ESS of the second power plant. Another relationship indicated by the arrows 278a, 278b, 278c may be that each power plant represented by the power plant models 270a, 270b, 270c may supply power to the grid loads represented by the grid load models 277a, 277b, and therefore an increase in power supplied by one power plant to meet the demand of the grid loads may allow the power supplied by the other power plants to be reduced.

The model 230 may be used to determine the effects of modifying an equipment model or a relationship throughout the network of power plants. For example, a user may modify an attribute of the first equipment model included in at least one of the power plant models. The attribute may be, for example, a degradation schedule, a power loss curve, or a weather forecast. Based on the modified attribute of the equipment model and the relationships between the components in the associated power plant model the change in operation of the associated power plant model may be determined. For example, an updated degradation schedule for a battery may reduce the expected storage capacity of the battery five years into the operation of power plant. Thus, one change in operation of the power plant may be that a solar RES in the system may deliver more power to the grid and less power to the battery. The model 230 may also be used to determine the change in operation of each other power plant represented in the network model based on the relationships between the power plants, the relationships between the power plants and the loads, and the change in operation of the power plants including the equipment model with the changed attribute. Continuing the example above, the reduction in the expected battery capacity of the battery in the first power plant may result in the first power plant being less able to deliver power to a first load at night. A nonrenewable power plant in the network and connected to the first load may experience a change in operation in which the nonrenewable power plant must increase production at night to make up for the reduction in power output from the ESS of the first power plant. Modifying an attribute of an equipment model or a relationship between components may have effects on every power plant in the network. By modeling the entire network, these effects can be determined, and decisions can be made based on the determined effects. For example, an upgraded degradation schedule for a battery in a first power plant indicating that the expected storage capacity will be lower than previously expected. Based on the changes in operation of the power plants in the network, the operator of the network may determine that additional solar capacity should be installed in a second power plant.

The network model 230 may be used to determine an expected change in operation of the power plants in the network of power plants represented by the network model 230 based on a changed attribute of an equipment model 271-274. For example, the expected change may be an expected change in operation of a power plant at a specific time in the future (e.g., at a time step). Each power plant model 270 may include a plurality of points through which the flow of power can be determined. For example, the power plant model 270a may have a point between the inverter model 272b and the ESS 273, and the flow of power through the point can represent the flow of power from the ESS to the inverter in the power plant represented by the model 270a. Network model 230 may be used to determine an expected change in power flow through the points at a specific time step. The model 230 may also be used to determine an energy storage level of an energy storage device (e.g., a SOC of a battery) at a specific time step after changing an attribute. Thus, the model 230 may determine a change in operation of a first power plant based on a modified attribute of an equipment model 271-274 of a power plant model 270 representing a second power plant.

Figure 5:
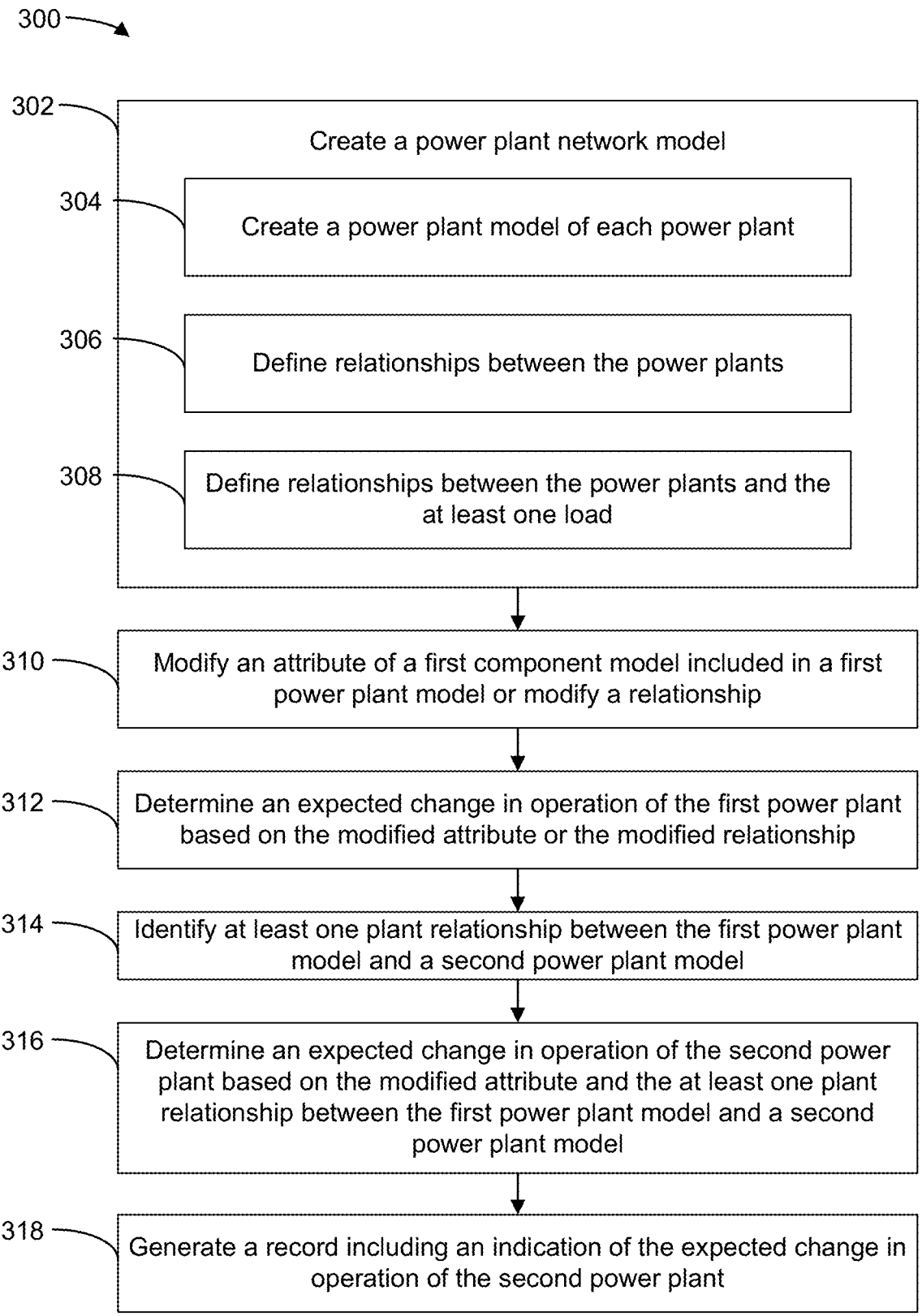
FIG. 5 is an example flow diagram of an example method of determining power flows in a network of power plants using the simulation system of FIG. 3 and the power flow model of FIG. 4, according to some embodiments.

Referring now to FIG. 5, a method 300 of optimizing a network of power plants is shown, according to some embodiments. In some embodiments, method 300 may include creating a model of the power plant network (e.g., the model 230) and using the model to determine changes in operation of each power plant in the network based on a modified attribute of an equipment model or a modified relationship between components, between power plants, or between power plants and loads. In some embodiments, the network model may have been previously created, and the method 300 may include using the model to determine changes in operation of each power plant in the network based on a modified attribute of an equipment model or a modified relationship between components, between power plants, or between power plants and loads. At operation 302 of the method 300, a power plant network model (e.g., the power flow model 230) may be created. Creating the power plant network model in operation 302 may include several sub-operations 304-308. At operation 304 of the method 300, a power plant model (e.g., power plant model 100) may be created within the power plant network model. Creating each power plant model in operation 302 may be substantially similar to creating the power plant model in operation 302 of the method 300. The power plant models may include equipment models (e.g., the inverter model 124, the transformer model 126, the RES model 108, the battery model 122, etc.) corresponding to components of the power plant. The equipment models may include various information about the respective component, as discussed above (e.g., degradation schedules, power loss curves, weather forecasts, etc.). Each power plant model may further include equipment relationships between the component models in the power plant model, as discussed above. The network model may represent a network of power plants, the power plant models may represent power plants in the network, and the equipment models may represent equipment in the power plants. The network model may also include load models representing loads connected to the power plants.

At operation 306 of the method 300, plant relationships between the power plant models may be defined, representing relationships between power plants in the network. For example, as discussed above with respect to FIG. 4, plant relationships between power plant models may include that the associated power plants are connected via a power grid and may supply power to and receive power from each other. Another plant relationship between power plant models may be that two associated power plants are each configured to supply power to the same BTM load. At operation 308 of the method 300, plant-load relationships between the power plant models and at least one load model may be defined, representing relationships between power plants in the network and loads coupled to the power plants. For example, as discussed above with respect to FIG. 4, plant-load relationships between power plant models and a load model may include that a BTM load is configured to receive power from a power plant. Another plant-load relationship between a power plant model and a load model may be that a grid load is configured to receive power from a power plant via a grid connection. The plant-load relationship may include a distance that power must travel via the grid to reach the load from the power plant.

At operation 310 of the method 300, an attribute of a first equipment model in a first power plant model (representing equipment in a first power plant) may be modified. For example, an attribute of an equipment model that may be modified may include a degradation schedule, a power loss curve, a weather forecast, a replacement date, an augmentation date, or any other feature relevant to the operation of the component. The attribute may be whether the equipment model is included in the power plant model at all. For example, modifying the attribute may include adding an ESS model to a power plant model that did not previously include an ESS model. In some embodiments, modifying the attribute may include incrementally modifying an input parameter of an equipment model across a predetermined range of values to determine at which value the power plant model or the power plant network model is optimized (e.g., a performance sweep, as discussed above). The equipment model may be included in more than one power plant model. For example, multiple power plant models may include the same battery model, and a modification of an attribute of the battery model may modify the attribute in each instance of the battery model. In some embodiments, operation 310 may include modifying a plant-load relationship, a plant relationship, and/or an equipment relationship, instead of or in addition to modifying the attribute of the first equipment model. Modifying an equipment relationship may include, for example, changing a number of inverters coupled to the solar RES, changing a distance between two batteries in an ESS, disconnecting an ESS from the RES, or any other change that affects the relationship between the two components in a power plant. Modifying a plant relationship may include, for example, disconnecting one of two power plants from a grid such that the two power plants cannot supply station power to each other. Modifying a plant-load relationship may include, for example, disconnecting a BTM load from a power plant such that the power plant cannot supply power to the BTM load.

At operation 312 of the method 300, an expected change in operation of the first power plant may be determined based on the modified attribute and/or the modified relationship, as well as the other equipment relationships in the first power plant model. The change in operation may be a change in power flow through various points of the power plant model, for example, as discussed above with respect to operation 166 of the method 150. The change in operation may be a change in operation at a specific time step. For example, if the modified attribute is a changed degradation schedule of a battery model in an ESS model, a change in operation determined at operation 312 may be a change in the amount of power flowing out of the battery model at a specific time five years in the future or a change in the amount of power flowing from a solar RES model in the power plant model to a power grid due to the change in expected capacity of the battery at the specific time five years in the future. Determining the change in operation of a power plant may also include determining an energy storage level of an energy storage device model (e.g., a SOC of a battery model). For example, if the changed attribute is an updated power loss curve of an inverter model coupled to a battery model, the SOC of the battery model may be different due to the amount of power lost at the inverter when charging the battery.

At operation 314 of the method 300, at least one plant relationship between the first power plant model and a second power plant model is identified. For example, the plant relationship may be any of the plant relationships discussed above. The plant relationship between the first power plant model and a second power plant model may result in the second power plant model being affected by the modified attribute of the first power plant model.

At operation 316 of the method 300, an expected change in operation of the second power plant may be determined based on the modified attribute and at least one plant relationship between the first power plant model and the second power plant model. Determining the change in operation of the second power plant model may be further based on equipment relationships between equipment models in the first power plant model, equipment relationships between equipment models in the second power plant model, and plant-load relationships between the first and second power plant models and the load models. For example, as discussed above with respect to FIG. 4, a change in the degradation schedule of a battery in a first power plant may reduce the amount of power the first power plant is able to supply to a BTM load. A second power plant connected to the BTM load may increase the amount of power supplied to the BTM load to make up for the reduction in power supplied by the first power plant. Thus, the change in a degradation schedule of the battery in the first power plant may cause a change in operation of the second power plant.

In some embodiments, the network model may include three or more power plant models. Determining the change in operation in the first power plant (determined in operation 312) and the change in operation in the second power plant (determined in operation 316) may be further based on equipment relationships between equipment models in any of the power plant models in the network model, plant relationships between power plant models in the network model, transmission losses and transmission capacities in the network model, and plant-load relationships between power plant models and load models in the network model.

At operation 318, a record may be generated including an indication of the expected change in operation of the second power plant model. Generating the record may include storing a modified version of the network model in a database. This may allow a user to quickly retrieve the information at a later time. For example, the method 300 may be performed in advance of a request from a user via a user interface, and the results may be stored in the database. When the user requests the power flows of a system after modifying an attribute, the results may be pulled from the database, and the method 300 may not need to be performed after receiving the request. Generating the record may include displaying the indication of the expected change in operation of the first and/or second power plants on the user interface. For example, the user interface may include a graphical representation of the network model, and the expected changes in operation may be displayed (e.g., numerically or graphically) on the model, for example, superimposed on the location where the expected change occurs. In some embodiments, the method 300 may include more or fewer operations than described above. For example, the method 300 may include operation 312 and may not include operation 316. In some embodiments, the method 300 may not include operation 302, as the model may have been previously generated. Instead, the method 300 may begin with operation 310.

As discussed above, modifying an attribute of the first equipment model may include incrementally modifying an input parameter of an equipment model across a predetermined range of values. Determining the change in operation of the power plant model including the first equipment model or other power plant models in the power plant network model may include determining the value in the predetermined range of values at which a property of the associated power plant model is minimized or maximized. For example, a power plant model including a solar RES may include an attribute indicating a number of solar panels in the RES. The number of solar panels may be incrementally modified across a predetermined range of values to determine the number of solar panels at which an income per panel is maximized. As another example, a distance between two batteries may be incrementally modified across a predetermined range of values to determine at which distance the thermal cooling load for the batteries is minimized. The property of the associated power plant model may depend in part on the relationships between the power plant models. For example, in determining a maximum battery capacity of an ESS coupled to a BTM load at which income per kilowatt-hour is maximized, the network model may take into account other power plants configured to supply power to the same BTM load. In addition to determining the value in the predetermined range at which the property of a power plant model is maximized or minimized, the value in the predetermined range at which the property of the entire network model is maximized or minimized may be determined. The property of a network model may be a financial cost associated with the network model, a revenue or profit associated with the network model, or another financial indicator associated with the network model. For example, a maximum capacity of a battery may be incrementally modified to determine at which point the added cost of purchasing and installing the battery exceeds the projected income from the increased capacity. This determination may take into account all the power plants in the network. For example, a network of three power plants may each be configured to supply power to a power grid and to each other through the power grid. Storage capacity in an ESS of one of the power plants may be incrementally modified to determine when the profit of the network is maximized, taking into account the cost of increasing the storage capacity of the ESS. Once the power plants, including the ESS, meet the demand of the grid, any added capacity would increase the cost of the ESS without increasing revenue. Thus, the method 300 may be used to optimize the storage capacity of the ESS.

The methods 150, 300 disclosed herein may be performed using the simulation system 200. Equipment models may be stored in at least one memory (e.g., in the asset database 224 of the remote internal server 226), and processor instructions may be stored in at least one memory (e.g., a local memory). In some embodiments, the at least one memory may store all of the instructions and models. At least one processor (e.g., the calculation tool 202) may execute the stored instructions to perform the methods 150, 300. A user may create the power plant and network models, including relationships, via a user interface (e.g., the GUI of the software module 262). In some embodiments, the power plant and network models may be previously stored in a database or memory, and a user may adjust or modify the models via the user interface. For example, the user may modify attributes of the equipment models, modify relationships, and input instructions for point analyses and performance sweeps via the user interface. Once the changes in operation of the various power plants models and/or power flow rates at various points in the power plant models are determined, a database (e.g., in the local memory, in a remote memory) may be updated so that the updated models and the determined changes can be accessed at a later time. The simulation system 200, including its ability to create power flow models 230 may provide an intuitive way to model complex components, subsystems, power plants, and networks of power plants. The power flow models 230 are unique data structures that improve power generation, cost, and revenue forecasting for power plant installations, particularly where an operator controls a network of power plants. The simulation system 200 makes it easier for a user to visualize the network and to see the network-wide effects of changes made to a single component, relationship, or power plant, as well as the network-wide effects of changes made to multiple components, relationships, or power plants. The simulation system may also allow the operator of a network of power plants to see real-time effects of changes in components, relationships, or power plants. This may help the operator to make planning, purchasing, and power delivery decisions to maximize efficiency and income.

In an aspect, a system for optimizing a network of power plants is provided. The system includes at least one memory storing a network model of a network of power, the network model including a power plant model for each power plant, each power plant model including one or more equipment models of power plant equipment of a power plant and plant relationships between the power plant models. The system further includes at least one processor configured to modify an attribute of a first equipment model included in a first power plant model of a first power plant of the network of power plants, identify at least one plant relationship between the first power plant model and a second power plant model of a second power plant of the network of power plants, determine an expected change in operation of the second power plant based on the modified attribute and the at least one plant relationship between the first power plant model and the second power plant model, generate a record including an indication of the expected change.

In some embodiments, each power plant model further includes equipment relationships between the equipment models, wherein determining the expected change in operation of the second power plant is further based on the equipment relationships. In some embodiments, the network model further includes plant-load relationships between the power plant models and a load model of a load configured to receive power from at least one power plant in the network of power plants, wherein determining the expected change in operation of the second power plant is further based on the plant-load relationships. In some embodiments, the plant-load relationships include at least one of electrical transmission losses associated with transmission of power between a power plant and a load or time-dependent electrical transmission limits associated with transmission of power between a power plant and a load. In some embodiments, at least one equipment model represents electrical losses associated with power plant equipment. In some embodiments, each power plant model includes a plurality of points, wherein determining the expected change in operation of the second power plant model includes determining a change in power flow through each point in the second power plant model in a first time step.

In some embodiments, the second power plant model includes an equipment model of an energy storage device, wherein determining the expected change in operation of the second power plant model further includes determining an energy storage level of an energy storage device model in a first time step. In some embodiments, the attribute of the first equipment model includes one of a weather forecast, a degradation schedule of an associated component, or a loss curve for the associated component. In some embodiments, modifying the attribute of the first equipment model includes including the first equipment model in a power plant model that did not previously include the first equipment model.

In some embodiments, modifying the attribute of the first equipment model includes incrementally modifying an input parameter of the first equipment model across a predetermined range of values, and wherein determining the expected change in operation of the second power plant includes determining a value in the predetermined range of values at which a property of the second power plant model is minimized or maximized. In some embodiments, the property of the second power plant model depends in part on the at least one plant relationship between the first power plant model and the second power plant model.

In some embodiments, the attribute of the first equipment model includes incrementally modifying an input parameter of the first equipment model across a predetermined range of values, and wherein determining the expected change in operation of a power plant includes determining a value in the predetermined range of values at which a property of the network model is minimized or maximized. In some embodiments, the property of the network model is one of a financial cost associated with the network model or a revenue associated with the network model. In some embodiments, a plurality of the power plant models include at least one of the first equipment model. In some embodiments, the system further includes a user interface, wherein the attribute is modified based on a user input via the user interface.

In another aspect, at least one non-transient computer readable medium is provided. The at least one medium contains instructions that, when executed by at least one processor, cause the at least one processor to retrieve, from a database, a network model of a network of power plants, the network model including power plant models of each power plant, each power plant model including one or more equipment models of power plant equipment of a power plant and plant relationships between the power plant models. The instructions further cause the at least one processor to modify an attribute of a first equipment model included in a first power plant model of a first power plant, identify at least one plant relationship between the first power plant model and a second power plant model of a second power plant, determine an expected change in operation of the second power plant based on the modified attribute and the at least one plant relationship between the first power plant model and the second power plant model, and generate a record including an indication of the expected change.

In some embodiments, the instructions further cause the at least one processor to modifying attributes of a plurality of equipment models in at least one power plant model. In some embodiments, modifying the attributes of the plurality of equipment models includes modifying a parameter affecting each of the attributes. In some embodiments, the parameter includes a weather forecast. In some embodiments, the parameter includes a plant financing model of a planned power plant, wherein the expected change in operation of the at least one power plant model includes a change in installation cost for the power plant. In some embodiments, modifying the attributes of the plurality of equipment models includes receiving a user input including an instruction for modifying the attributes.

In another aspect, a method of optimizing a network of power plants is provided. The method includes retrieving, from a database, a network model of a network of power plants. The network model includes power plant models of each power plant and plant relationships between the power plant models. Each power plant model includes one or more equipment models of power plant equipment of a power plant of the network of power plants. The method further includes modifying an attribute of a first equipment model included in a first power plant model of a first power plant of the network of power plants, identifying at least one plant relationship between the first power plant model and a second power plant model of a second power plant of the network of power plants, determining an expected change in operation of the second power plant based on the modified attribute and the at least one plant relationship between the first power plant model and the second power plant model, and generating a record including an indication of the expected change.

In some embodiments, modifying the attribute of the first equipment model includes incrementally modifying an input parameter of the first equipment model across a predetermined range of values, and wherein determining the expected change in operation of the second power plant includes determining a value in the predetermined range of values at which a property of the second power plant model is minimized or maximized.

In another aspect, a system for determining power flows in a power plant including an energy storage system (ESS) including an energy storage device and a power generation system including a power source is provided. The system includes at least one memory storing a power plant model of the power plant, the power plant model including an ESS model of the ESS, the ESS model including an energy storage device model of the energy storage device, a power generation system model of the power generation system, at least one load model of at least one load configured to receive power from the power plant, and system relationships between the ESS model, the power generation system model, and the at least one load model. The system further includes at least one processor configured to receive input parameters for the at least one load, determine, based on the input parameters and the system relationships, at least one of a power flow rate at least one point in the power plant or an energy storage level of the energy storage device at a first time step, and generate a record including an indication of at least one of the power flow rate or the energy storage level.

In some embodiments, the ESS model includes a first set of equipment models corresponding to equipment of the ESS, the first set of equipment models including the energy storage device model and equipment relationships between the equipment models in the first set. The power generation system model includes a second set of equipment models corresponding to equipment of the power generation system, the second set of equipment models including the power source model and equipment relationships between the equipment models in the second set. Determining the at least one of the power flow rate or the energy storage level is further based on the equipment relationships between the equipment models in the first set and the equipment relationships between the equipment models in the second set. In some embodiments, at least one equipment model of the first set of equipment models or the second set of equipment models includes a degradation schedule of associated equipment or a loss curve for the associated equipment.

In some embodiments, the energy storage device is a battery and the energy storage level is a state of charge of the battery. In some embodiments, the input parameters include one or more power demand schedules for the at least one load. In some embodiments, the power source is an array of solar panels and wherein the power source model includes a weather forecast. In some embodiments, the at least one processor is further configured to determine a round-trip efficiency of the ESS based on the ESS model. In some embodiments, the system further includes a user interface, and the input parameters are received from a user input via the user interface.

In some embodiments, at least one non-transient computer readable medium is provided and contains instructions that, when executed by at least one processor, cause the at least one processor to retrieve a power plant model of a power plant from a database, the power plant model including an ESS model of an ESS of the power plant, a power generation system model of a power generation system of the power plant, at least one load model of at least one load configured to receive power from the power plant, and system relationships between the ESS model, the power generation system model, and the at least one load model. The instructions further cause the at least one processor to receive input parameters for the at least one load, determine, based on the input parameters and the system relationships, at least one of a power flow rate at at least one point in the power plant or an energy storage level of the energy storage device at a first time step, and generate a record including an indication of at least one of the power flow rate or the energy storage level. In some embodiments, the input parameters are received from a user input via a user interface. In some embodiments, the input parameters include one or more power demand schedules for the at least one load.

In some embodiments, the ESS model includes a first set of equipment models corresponding to equipment of the ESS, the first set of equipment models including an energy storage device model corresponding to an energy storage device and equipment relationships between the equipment models in the first set. The power generation system model includes a second set of equipment models corresponding to equipment of the power generation system, the second set of equipment models including a power source model corresponding to a power source and equipment relationships between the equipment models in the second set. Determining the at least one of the power flow rate or the energy storage level is further based on the equipment relationships between the equipment models in the first set and the equipment relationships between the equipment models in the second set. In some embodiments, at least one equipment model of the first set of equipment models or the second set of equipment models includes a degradation schedule of associated equipment or a loss curve for the associated equipment.

In another aspect, a method for determining power flows in a power plant is provided. The method includes retrieving a power plant model of a power plant from a database. The power plant model includes an ESS model of an ESS of the power plant, a power generation system model of a power generation system of the power plant, at least one load model of at least one load configured to receive power from the power plant, and system relationships between the ESS model, the power generation system model, and the at least one load model. The method further includes receiving input parameters for the at least one load, determining, based on the input parameters and the system relationships, at least one of a power flow rate at at least one point in the power plant or an energy storage level of the energy storage device at a first time step, and generating a record including an indication of at least one of the power flow rate or the energy storage level.

In some embodiments, the ESS model includes a first set of equipment models corresponding to equipment of the ESS, the first set of equipment models including the energy storage device model, and equipment relationships between the equipment models in the first set. The power generation system model includes a second set of equipment models corresponding to equipment of the power generation system, the second set of equipment models including the power source model, and equipment relationships between the equipment models in the second set. Determining the at least one of the power flow rate or the energy storage level is further based on the equipment relationships between the equipment models in the first set and the equipment relationships between the equipment models in the second set. In some embodiments, at least one equipment model of the first set of equipment models or the second set of equipment models includes a degradation schedule of associated equipment or a loss curve for the associated equipment. In some embodiments, the energy storage device is a battery and the energy storage level is a state of charge of the battery. In some embodiments, the power source is an array of solar panels and wherein the power source model includes a weather forecast. In some embodiments, the input parameters are received from a user input via a user interface. In some embodiments, the input parameters include one or more power demand schedules for the at least one load.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. A system for optimizing a network of power plants, the system comprising:
    at least one memory storing a network model of a network of power plants, the network model comprising:
        a power plant model for each power plant of the network of power plants, each power plant model comprising one or more equipment models of power plant equipment of a power plant;
        plant relationships between the power plant models; and
    at least one processor configured to:
        modify an attribute of a first equipment model included in a first power plant model of a first power plant of the network of power plants;
        identify at least one plant relationship between the first power plant model and a second power plant model of a second power plant of the network of power plants;
        determine an expected change in operation of the second power plant based on the modified attribute and the at least one plant relationship between the first power plant model and the second power plant model; and
        generate a record comprising an indication of the expected change,
            wherein the first power plant or the second power plant is configured based on the expected change in operation of the second power plant.

2. The system of claim 1, wherein each power plant model further comprises equipment relationships between the equipment models, wherein determining the expected change in operation of the second power plant is further based on the equipment relationships.

3. The system of claim 2, wherein the network model further comprises plant-load relationships between the power plant models and a load model of a load configured to receive power from at least one power plant in the network of power plants, wherein determining the expected change in operation of the second power plant is further based on the plant-load relationships.

4. The system of claim 2, wherein the plant-load relationships include at least one of (a) electrical transmission losses associated with transmission of power between a power plant and a load or (b) time-dependent electrical transmission limits associated with transmission of power between a power plant and a load.

5. The system of claim 1, wherein at least one equipment model represents electrical losses associated with power plant equipment.

6. The system of claim 1, wherein each power plant model comprises a plurality of points, wherein determining the expected change in operation of the second power plant model comprises determining a change in power flow through each point in the second power plant model in a first time step.

7. The system of claim 1 wherein the second power plant model comprises an equipment model of an energy storage device, wherein determining the expected change in operation of the second power plant model further comprises determining an energy storage level of an energy storage device model in a first time step.

8. The system of claim 1, wherein the attribute of the first equipment model comprises one of a weather forecast, a degradation schedule of an associated component, or a loss curve for the associated component.

9. The system of claim 1, wherein modifying the attribute of the first equipment model comprises including the first equipment model in a power plant model that did not previously include the first equipment model.

10. The system of claim 1, wherein modifying the attribute of the first equipment model comprises incrementally modifying an input parameter of the first equipment model across a predetermined range of values, and wherein determining the expected change in operation of the second power plant comprises determining a value in the predetermined range of values at which a property of the second power plant model is minimized or maximized.

11. The system of claim 10, wherein the property of the second power plant model depends in part on the at least one plant relationship between the first power plant model and the second power plant model.

12. The system of claim 1, wherein modifying the attribute of the first equipment model comprises incrementally modifying an input parameter of the first equipment model across a predetermined range of values, and wherein determining the expected change in operation of a power plant comprises determining a value in the predetermined range of values at which a property of the network model is minimized or maximized.

13. The system of claim 12, wherein the property of the network model is one of a financial cost associated with the network model or a revenue associated with the network model.

14. The system of claim 1, wherein a plurality of the power plant models include at least one of the first equipment model.

15. The system of claim 1, further comprising a user interface, wherein the attribute is modified based on a user input via the user interface.

16. At least one non-transient computer readable medium containing instructions that, when executed by at least one processor, cause the at least one processor to:
retrieve, from a database, a network model of a network of power plants, the network model including:
power plant models of each power plant, each power plant model comprising one or more equipment models of power plant equipment of a power plant of the network of power plants; and
plant relationships between the power plant models;
modify an attribute of a first equipment model included in a first power plant model of a first power plant of the network of power plants;
identify at least one plant relationship between the first power plant model and a second power plant model of a second power plant of the network of power plants;
determine an expected change in operation of the second power plant based on the modified attribute and the at least one plant relationship between the first power plant model and the second power plant model; and
generate a record comprising an indication of the expected change,
wherein the first power plant or the second power plant is configured based on the expected change in operation of the second power plant.

17. The at least one medium of claim 16, wherein the instructions, when executed by the at least one processor, further cause the at least one processor to modify attributes of a plurality of equipment models in at least one power plant model.

18. The at least one medium of claim 17, wherein modifying the attributes of the plurality of equipment models comprises modifying a parameter affecting each of the attributes.

19. The at least one medium of claim 18, wherein the parameter comprises a plant financing model of a planned power plant, wherein the expected change in operation of the at least one power plant model comprises a change in installation cost for the power plant.

20. A method of optimizing a network of power plants, the method comprising:
retrieving, from a database, a network model of a network of power plants, the network model including:
power plant models of each power plant, each power plant model comprising one or more equipment models of power plant equipment of a power plant of the network of power plants; and
plant relationships between the power plant models;
modifying an attribute of a first equipment model included in a first power plant model of a first power plant of the network of power plants;
identifying at least one plant relationship between the first power plant model and a second power plant model of a second power plant of the network of power plants;
determining an expected change in operation of the second power plant based on the modified attribute and the at least one plant relationship between the first power plant model and the second power plant model; and
generating a record comprising an indication of the expected change,
wherein the first power plant or the second power plant is configured based on the expected change in operation of the second power plant.

21. The method of claim 20, wherein modifying the attribute of the first equipment model comprises incrementally modifying an input parameter of the first equipment model across a predetermined range of values, and wherein determining the expected change in operation of the second power plant comprises determining a value in the predetermined range of values at which a property of the second power plant model is minimized or maximized.

* * * * *